United States Patent [19]

Romano et al.

[11] Patent Number: 5,710,873
[45] Date of Patent: Jan. 20, 1998

[54] APPARATUS AND METHOD FOR MAXIMIZING A RATE OF IMAGE DATA TRANSFER IN A PRINTING SYSTEM

[75] Inventors: Kenneth D. Romano, Webster; Anthony M. Frumusa, Penfield; Samuel D. Ambalavanar, Rochester; Robert M. Chapin, Rushville; Daniel A. Mohabir, Walworth; Mehdi Mansoori, Rochester, all of N.Y.

[73] Assignee: Xerox Corporation, Stamford, Conn.

[21] Appl. No.: 315,277

[22] Filed: Sep. 29, 1994

[51] Int. Cl.$^6$ .................................................. G06K 15/00
[52] U.S. Cl. .................................................. 395/115; 395/114
[58] Field of Search .................. 395/102, 112, 114, 115, 116, 128, 139, 507–511, 680, 681, 682, 683, 280, 287, 292, 306, 307, 308, 872; 358/296, 443–445, 261.4; 399/82–83

[56] References Cited

U.S. PATENT DOCUMENTS

| | | | |
|---|---|---|---|
| 3,597,071 | 8/1971 | Jones | 355/3 |
| 4,122,520 | 10/1978 | Adamchick et al. | 395/115 |
| 4,821,107 | 4/1989 | Naito et al. | 358/256 |
| 4,899,291 | 2/1990 | Tsukada et al. | 364/518 |
| 4,947,345 | 8/1990 | Paradise et al. | 364/519 |
| 5,016,114 | 5/1991 | Sakata et al. | 358/404 |
| 5,021,892 | 6/1991 | Kita et al. | 358/468 |
| 5,038,218 | 8/1991 | Matsumoto | 358/296 |
| 5,047,955 | 9/1991 | Shope et al. | 364/519 |
| 5,095,369 | 3/1992 | Ortiz et al. | 358/296 |
| 5,113,494 | 5/1992 | Menendez et al. | 395/163 |
| 5,170,340 | 12/1992 | Prokop et al. | 364/143 |
| 5,175,633 | 12/1992 | Saito et al. | 358/406 |
| 5,223,948 | 6/1993 | Sakurai et al. | 358/404 |
| 5,276,799 | 1/1994 | Rivshin | 395/162 |
| 5,301,262 | 4/1994 | Kashiwagi | 395/117 |
| 5,303,341 | 4/1994 | Rivshin | 395/162 |
| 5,307,458 | 4/1994 | Freiburg et al. | 395/162 |

FOREIGN PATENT DOCUMENTS

| | | | |
|---|---|---|---|
| 1531401 | 11/1978 | United Kingdom | 395/115 |

*Primary Examiner*—Arthur G. Evans
*Attorney, Agent, or Firm*—Gary B. Cohen

[57] ABSTRACT

A printing system for processing one or more images of a job is provided. The printing system includes a video bus communicating with both a first transfer module and an image processing section. In operation, a first segment of the job is processed in the image processing section while a second segment of the job is buffered in the first transfer module. Subsequently, the first segment of the job is transferred away from the image processing section, with a second transfer module, coincidentally with the the second segment being transferred to the image processing section.

22 Claims, 22 Drawing Sheets

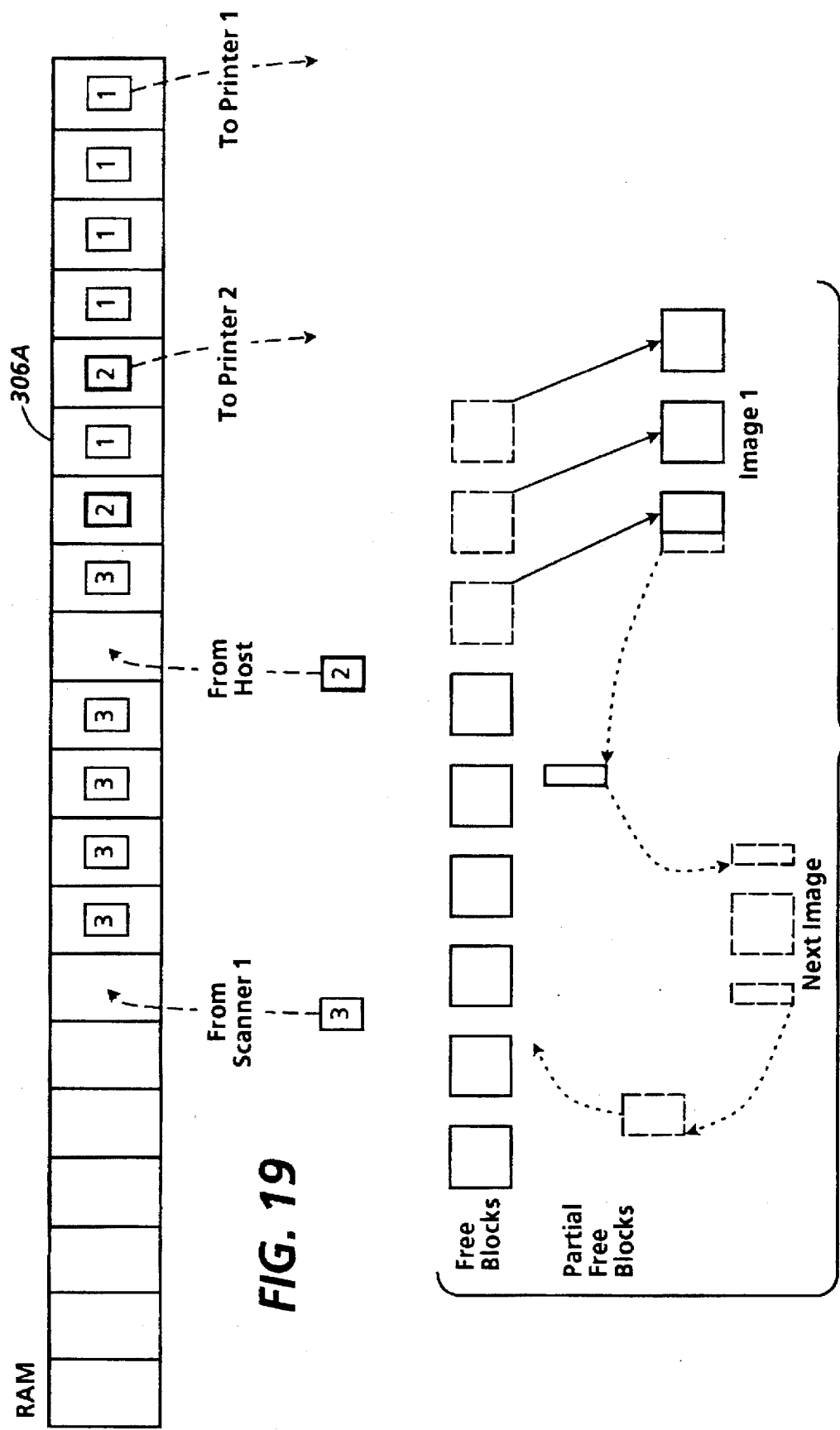

APPARATUS AND METHOD FOR MAXIMIZING A RATE OF IMAGE DATA TRANSFER IN A PRINTING SYSTEM

BACKGROUND OF THE INVENTION

The present invention relates generally to a technique for processing, storing and/or outputting image data, of a stored job, with a printing machine and, more particularly, to an apparatus and method for performing one or more image processing operations on one segment of the job, the one segment being transferred to an image processing section of the printing machine while another segment of the job is being transferred to a storage or output location other than the image processing section.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the IIT from, among other sources, a network or a scanner. An example of an IIT with both network and scanner inputs is found in the following patent, the pertinent portions of which are incorporated herein by reference:

U.S. Pat. No. 5,170,340

Patentees: Prokop et al

Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. Jobs provided at the IIT may be stored in a memory section, sometimes referred to as "electronic precollation memory." An example of electronic precollation memory may be found in the following patent:

U.S. Pat. No. 5,047,955

Patentees: Shope et al

Issued: Sep. 10, 1991

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality" continues to grow. As illustrated by the following patent, a multifunctional digital copier can assume the form of an arrangement in which a single electrostatic processing printer is coupled with a plurality of different image input devices, with such devices being adapted to produce image related information for use by the printer.

U.S. Pat. No. 3,957,071

Patentee: Jones

Issued: Jul. 27, 1971

U.S. Pat. No. 3,957,071 discloses that the image related information, in one example, could have its origin in video facsimile signals, microfilm, data processing information, light scanning platens for full size documents, aperture cards and microfiche.

The following patents also relate to the area of multifunctional digital copying:

U.S. Pat. No. 4,821,107

Patentees: Naito et al

Issued: Apr. 11, 1989

U.S. Pat. No. 5,021,892

Patentees: Kita et al

Issued: Jun. 4, 1991

U.S. Pat. No. 5,175,633

Patentees: Saito et al

Issued: Dec. 29, 1992

U.S. Pat. No. 5,223,948

Patentees: Sakurai et al

Issued: Jun. 29, 1993

U.S. Pat. No. 5,276,799

Patentee: Rivshin

Jan. 4, 1994

U.S. Pat. No. 5,307,458

Patentees: Freiburg et al

Issued: Apr. 26, 1994

U.S. Pat. No. 4,821,107 discloses a multifunctional image apparatus which is operable in one of various office automation modes, such as copy mode, facsimile mode, printer mode and the like. The multifunctional imaging apparatus is comprised of an image reading section, an image forming section and a communication section for transmitting and receiving image data.

U.S. Pat. No. 5,175,633 and U.S. Pat. No. 5,307,458 respectively disclose systems that exploit a coprocessor to access, among others, facsimile and communication functions. In the latter of these patents, a plurality of input/output devices reside on a common bus with a video processor, with the video processor using an electronic precollation scheme. In the '458 patent, a first set of image data is processed in the video processor while a second set of image data is buffered in the coprocessor. An arbiter permits the coprocessor to have the bus, for a selected interval, to process the second set of image data in the video processor.

U.S. Pat. No. 5,276,799 discloses a multi-bus printing system in which multiple tasks can be performed at any one moment in time. More particularly, a group of intelligent modules is in communication with a CBus, DBus and VBus, respectively, while a CPU processing module is in communication with the CBus and a DMA processing module is in communication with the DBus. One feature of this multi-bus printing system is that it provides a high level of concurrency. For example, in one embodiment three separate sets of data can be substantially concurrently transferred across the CBus, DBus and VBus.

Digital copiers typically seek to optimize concurrency and/or multi-tasking in operation. Xerox' DocuTech® optimizes multitasking by using a plurality of processors to operate individual services, such as scanning, printing, storing and decomposing, simultaneously. Accordingly, in one example, a document can be scanned while another document is being printed. Even though this sort of multitasking is desirable, it requires a substantial amount of both processing capability and storage space. A printing system, with an architecture of substantially smaller scale than DocuTech®, may be found in the following patent:

British Patent 1,531,401

Patentees: Davy et al

Publication Date of Complete Specification: Nov. 8, 1976

British Patent 1,531,401 discloses a system with a bus to which an input section, precollation memory and an output section are operatively coupled. Each of the input section and the output section includes a set of buffers and a direct memory access (DMA) interface. One DMA interface serves to transfer a first set of buffered data from one of the input buffers to the precollation memory while another DMA interface serves to transfer a second set of data from the precollation memory to one of the output buffers. Another patent that uses an architectural concept similar to that of the '401 British patent can be found in the following reference:

U.S. Pat. No. 5,301,262

Patentee: Kashiwagi

Issued: Apr. 5, 1994

The '262 patent, in contrast to the '401 British patent, compresses image data, prior to storing it in a page buffer, and decompresses the image data, prior to outputting it.

Since digital copiers process images in the form of image signals, images generated with a scanner, or stored in a memory location, can be enhanced through the use of image processing. The following patents disclose digital copying/printing systems in which image processing is provided:

U.S. Pat. No. 4,947,345

Patentees: Paradise et al

Issued: Aug. 7, 1990

U.S. Pat. No. 5,016,114

Patentees: Sakata et al

Issued: May 14, 1991

U.S. Pat. No. 5,038,218

Patentee: Matsumoto

Issued: Aug. 6, 1991

U.S. Pat. No. 5,113,494

Patentees: Menendez et al

Issued: May 12, 1992

U.S. Pat. No. 5,016,114 discloses a printing system in which image processing is provided at a scanner. In response to scanning a document, image signals are transmitted to various image processing stations. As the signals are processed, they are stored in a main storage section for eventual output.

A clear shortcoming of U.S. Pat. No. 5,016,114 is that loopback of stored image data back, through the image processing stations of the scanner, is not contemplated. This capability is, under certain circumstances, necessary for image data received from a network. For example, it may become necessary to print image data from a network at a resolution that is higher or lower than the resolution at which it was received.

U.S. Pat. No. 4,947,345 and U.S. Pat. No. 5,038,218 contemplate respective systems in which stored image data can be transferred, with DMA, from a page buffer to an image processing section. In particular, in the '345 system, a DMA interface can be used to transfer image data between a pair of page buffers and a reduction/enlargement processor, while, in the '218 system, a DMA controller can be used to move image data between a page memory and a resolution converter. Since the DMA in both the '218 and '345 systems is centralized, the data transfer capability of the system is reduced when the DMA is being used to service the image processing section. That is, the respective image processing sections of the '218 and '345 systems can monopolize the DMA, and the bus, while image data is being transferred from the page buffer(s) to the image processing section.

U.S. Pat. No. 5,113,494 contemplates a system in which loopback is achievable. More particularly, the '494 patent permits buffered image data to be moved to and from an image processing section, across a bus, with a DMA device disposed in either a SCSI interface or a printer interface. Additionally, the processed image data can then be transferred to a file server or a printer through use of a DMA device. U.S. Pat. No. 5,113,494 does not contemplate an arrangement in which processed image data can be transferred from an image processing section, under the influence of a first DMA device, while unprocessed image data is being transferred to the image processing section under the influence of a second DMA device. That is, image data cannot, be "pushed" and "pulled", relative to the image processing section, simultaneously. This is because the DMA devices of the SCSI interface and the printer interface are coupled to the bus serially. It would be desirable to provide a printing system, with a processor, in which a first transfer module, functioning independently of the processor, transfers image data to an image processing section while a second transfer module, functioning independently of the processor, transfers processed image data away from the image processing module.

In various ones of the the above references in which DMA is used to transfer data, it is common for one bus master, such as a storage device, to access a main bus and transfer all of its image data, under the influence of DMA, to another bus master, such as a printer. An example of this sort of DMA transfer may be found in the following patent:

U.S. Pat. No. 5,303,341

Patentee: Rivshin

Issued: Apr. 12, 1994

This approach to DMA transfer is less than desirable when many bus masters wish to access the bus at the same time. It should be further noted that U.S. Pat. No. 5,307,458 is capable of transferring a first job, from a coprocessor to a storage or output device, under the influence of DMA, while a part of a second job is being buffered in a main video processor. After the first job has been stored in or outputted from the main video processor, the second job part can then be transferred to memory, under the influence of DMA. This approach still, however, does not address the problem that arises, in a printing system with one main video bus, when one bus master occupies the main video bus for any considerable amount of time.

In computer applications, this problem is managed through "time-sharing". Indeed, it is believed that Xerox Corporation has used the concept of time-sharing in its network printing system that employs a 6085 workstation with a network compatible printer. For example, over a given time interval, a job may be sent to the printer while data is being received at the workstation. It is believed, however, that Xerox' network printing system does not permit job segments of multiple jobs to be transmitted to multiple output devices in a time shared manner. It would be desirable to provide a printing system with such capability.

The pertinent portions of all of the above-discussed references are incorporated herein by reference.

BRIEF DESCRIPTION OF THE INVENTION

In accordance with one aspect of the disclosed embodiment there is provided a printing system, including a controller, for processing one or more images of a job with the job being stored in a job storage area and the images being represented by image signals, comprising: a video bus for transmitting image signals of the job, represented by one or more segments, from the job storage area to one of a plurality of destinations; an image processing section, communicating with the video bus, for performing one or more image processing operations on at least one image associated with the job; a first transfer module, communicating with the video bus, including: a first buffer for buffering a first set of image signals representing a first segment of the job, and a first programmable direct memory access apparatus, responsive to the controller, for transferring the first segment of the job from the first buffer to the image processing section, wherein, in response to transferring the first segment, a second set of image signals, representing a second segment of the job is buffered in the first buffer; and a second transfer module, communicating with both the video bus and the second output device, the second transfer module being disposed in parallel with the first transfer module and including a second programmable direct memory access apparatus, responsive to the controller, for transferring the first segment of the job from the image processing section, to a selected one of a storage area and an output device, while the second segment of the job is being transferred from the first buffer to said image processing section.

In accordance with another aspect of the disclosed embodiment, there is provided a printing system, including a controller, for managing respective output operations of a first job and a second job with each of the first and second jobs having a dimension and being represented by image signals, comprising: a video bus for transmitting image signals of the first and second jobs thereacross; a first storage area, communicating with said video bus, for storing the second job; a first output device and a second output device, each of said first and second output devices communicating with said video bus; a first transfer module, communicating with both said video bus and said first output device, including: a first buffer for buffering a first set of image signals representing a first segment of the first job, the first segment including a packet dimension, the packet dimension of the first segment being less than the first job dimension, and a first programmable direct memory access apparatus, responsive to the controller, for transferring the first segment of the job from the first buffer to said first output device, and a second transfer module, communicating with both said video bus and said second output device, said second transfer module being disposed in parallel with said first transfer module, said second transfer module including a second programmable direct memory access apparatus, responsive to the controller, for transferring a second set of image signals representing a second segment of the second job from said first storage area to said second output device while the first job segment is being transferred, with said first transfer module, to said first output device, the second segment including a packet dimension with the packet dimension of the second segment being less than the second job dimension.

These and other aspects of the invention will become apparent from the following description, the description being used to illustrate a preferred embodiment of the invention when read in conjunction with the accompanying drawings.

BRIEF DESCRIPTION OF THE DRAWINGS

FIG. 19 is a schematic representation of electronic pre-collation (EPC) memory being used in conjunction with the resource management scheme of the present invention;

FIG. 20 is a schematic representation illustrating how partial blocks are employed, in the resource management scheme, to reduce memory fragmentation;

DETAILED DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
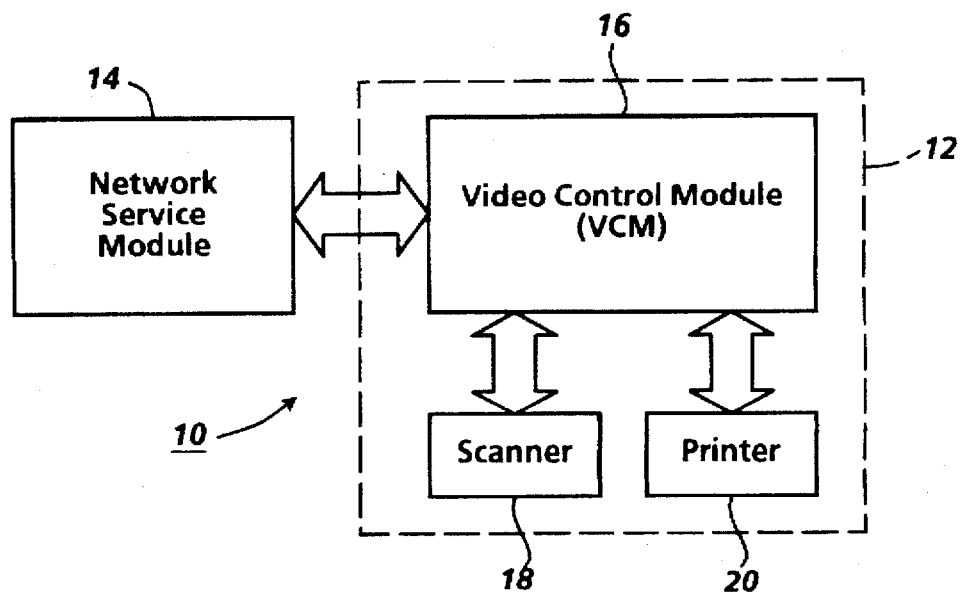
FIG. 1 is a block diagram depicting a multifunctional, network adaptive printing machine.

Referring to FIG. 1, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 2), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 1, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 2) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 2:
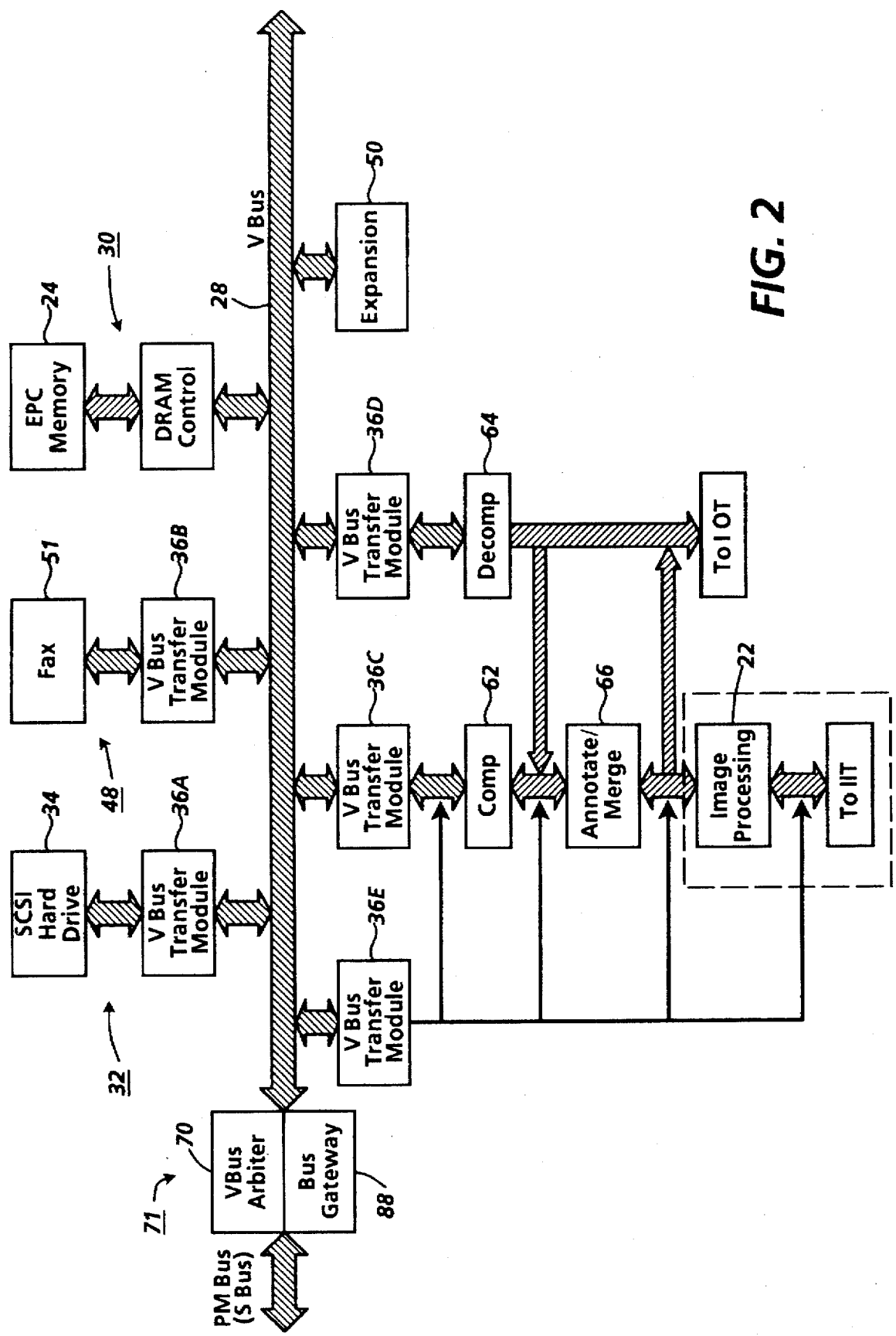
FIG. 2 is a block diagram of a video control module for the printing machine of FIG. 1.

Referring specifically to FIG. 2, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 MBytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way the transfer module 36a through use of a suitable interface and a SCSI line.

Figure 3:
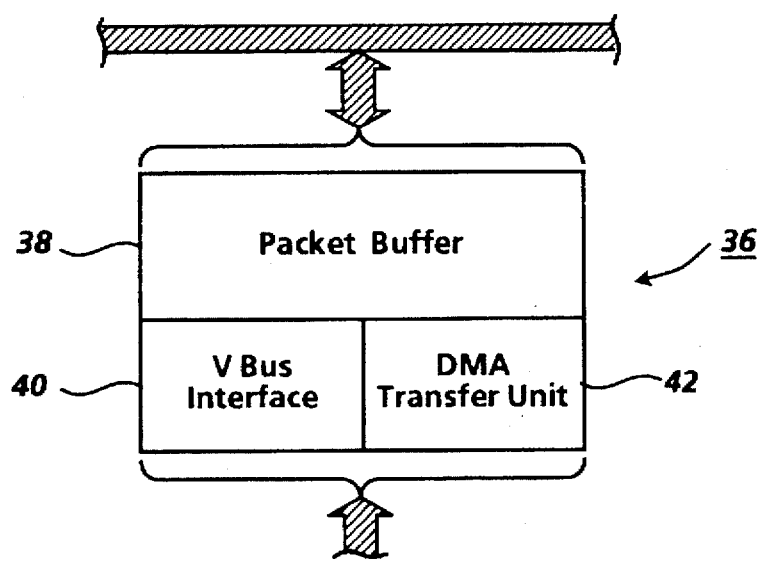
FIG. 3 is a block diagram of a transfer module used in conjunction with the printing machine of FIG. 2.

Referring to FIG. 3, the structure of one of the transfer modules 36 is discussed in further detail. The illustrated transfer module of FIG. 3 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can programmed to handle packets of up to 64 Bytes Preferably, the packet size would be reduced for times when the VBus is relatively busy and increased for times when activity on the bus is relatively low.

Figure 5:
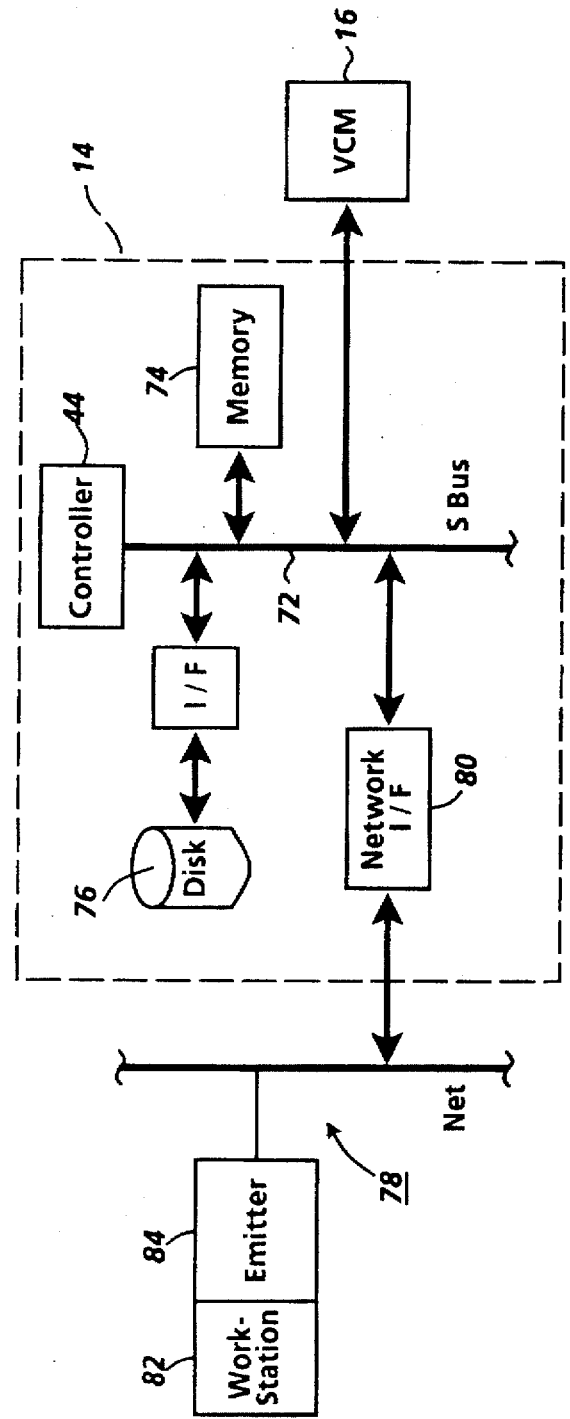
FIG. 5 is a block diagram of a network controller for the printing machine of FIG. 1.

Adjustment of the packet size is achieved with the VBus interface 40 and a system controller 44 (FIG. 5). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below More particularly, each imageThe DMA transfer unit employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 4:
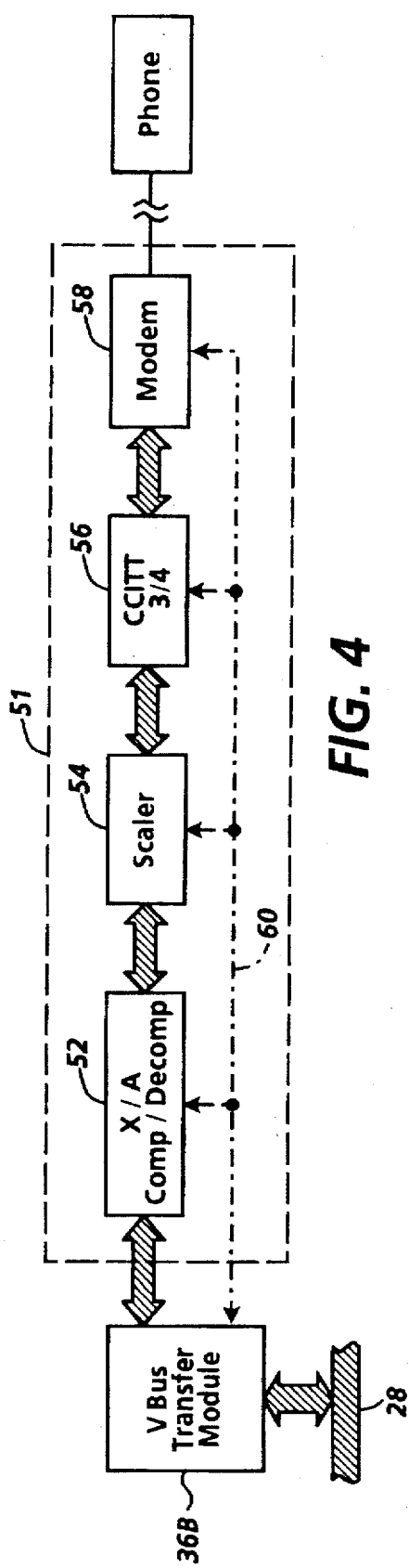
FIG. 4 is a block diagram of a facsimile card used in conjunction with the printing machine of FIG. 2.

Referring to FIGS. 1 and 2, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 4, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 4, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 2, the IIT 18 and IOT 20 are operatively coupled to the VBus 28 by of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 2, the scanner 18, which includes the image processing section 22, is coupled with an annotate/merge module 66. Preferably the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 2, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 5, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 5, a host memory 74, which preferably assumes the form of DRAM, and a SCSI disk drive device 76 are coupled operatively to the SBus 72. While not shown in FIG. 5, a storage or I/O device could be coupled with the SBus with a suitable interface chip. As further shown in FIG. 5, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. application Ser. No. 07/898,761 entitled "Apparatus and Method for Multi-Stage/Multi-Process Decomposing", filed on Jun. 12, 1992, by Bonk et al., and U.S. Pat. No. 5,226,112 to Mensing et al., the pertinent portions of both references being incorporated herein by reference. Further details regarding a technique for generating a job in a PDL may be obtained by reference to the following text, the pertinent portions of which are incorporated herein by reference:

PostScript® Language Reference Manual

Second Edition

Addison-Wesley Publishing Co.

1990

Referring again to FIG. 2, the network service module 14 is coupled with the VCM 16 via a bus gateway 88 of the VBus. arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 2, 3 and 5, further discussion regarding DMA transfer of each of the transfer modules 36 is provided. In particular, in one example, the images of a job are stored in the host memory 74 as a series of blocks. Referring to FIG. 19, a series of blocks is shown as being stored in the EPC memory 24. Preferably, each block comprises a plurality of packets. In operation, one of the transfer modules 36 is provided, by the controller 44, with the beginning address of a block and the size of the block. In turn, for that block, the transfer module 36 effects a packet tranfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Referring to FIGS. 2, and 5–7, one aspect of operation of the above described printing system is discussed. In particular, FIGS. 6 and 7 relate to an advantageous manner in which the transfer modules 36 are employed to facilitate a loopback approach for image processing of jobs which are captured at a location other than the scanner 18. In the illustrated embodiment of FIG. 6, a job is captured in the network service module 14 (step 90). This is not to imply, however, that the loopback operation could not be performed, with equal facility, on a job captured at another location, such as the FAX module 48. Upon capturing the network job, it is either spooled in, for example, the SCSI disk 76 for eventual decomposition (steps 92, 94) or decomposed with the controller 44 for storage in the host memory 74 (steps 92, 96). If the process branches to step 94, a return is encountered. Accordingly, functions are performed, relative to other jobs, until the system is ready to decompose the spooled job. When it is time to decompose the spooled job, processing of the spooled job will resume at step 96.

Assuming that the job is decomposed, and image processing is required by the job, one or more transfer modules 36 are programmed, via step 98, for transferring electronic pages of the job to one or more destinations. It should be appreciated that, in one example, it may be desirable to program transfer module 36e for transferring an electronic page to the image processing section 22 and to program transfer module 36c for transferring the resulting image processed electronic page to EPC memory 24. It will be appreciated that other ones of the transfer modules could be programmed in a manner that would enhance system concurrency. For example, in the case where the image processed electronic page is transferred to EPC memory, the transfer module 36a could be programmed to spool a copy of the image processed electronic page in the SCSI disk 34.

At step 100, it is determined whether a current electronic page requires image processing. Initially, this determination would be made for a first page of the job. Assuming that the current electronic page does not require image processing, it is determined, at step 102, whether the current electronic page is to be transferred to a location other than the host memory 74. In one example, it may be desired to transfer the electronic page to the EPC memory 24 for eventual output (at, for example, the printer 20 or the facsimile device 51) or storage (in the SCSI disk 34). If the current page is to be transferred, then step 104 is executed, otherwise, the process proceeds to step 106 (FIG. 7) so that further electronic pages can be, if necessary, image processed and/or transferred (step 107).

Assuming that the current electronic page is to be image processed (FIG. 6), the image processing section 22 is set up, via step 108, to perform one or more selected image processing operations on a selected electronic page. In response to setting up appropriate image processing control registers, at step 108, the current electronic page is transferred, with the transfer module 36e, to the image processing section 22 (step 110) and, at step 112, one or more programmed image processing operations are performed on the current electronic page. Upon completion of the image processing operations, it is determined, at step 114, whether the image processed electronic page should be transferred to storage (e.g. EPC memory 24 or host memory 74) or an output device (e.g. printer 20 or FAX module 48).

If the current electronic page is to be stored, then a decision is made, at step 118 (FIG. 7), as to whether the current electronic page is to be stored. For the most part, the printing system compresses the current electronic page, to promote efficient storage, unless a print of the current electronic page is to be produced. Indeed, even when printing a job, the corresponding electronic pages are often compressed and then stored in the EPC memory for "print readiness". With this approach a selected number of job copies can be printed without capturing/processing the job more than once. In some instances, however, it may be desirable to produce a single print from a current electronic job. For example, a single print may be produced for purposes of proofing. If compression is required, then the current electronic page is passed to the compressor 62, at step 120, otherwise, a storage destination of the current electronic page is determined directly, at step 122.

Figure 6:
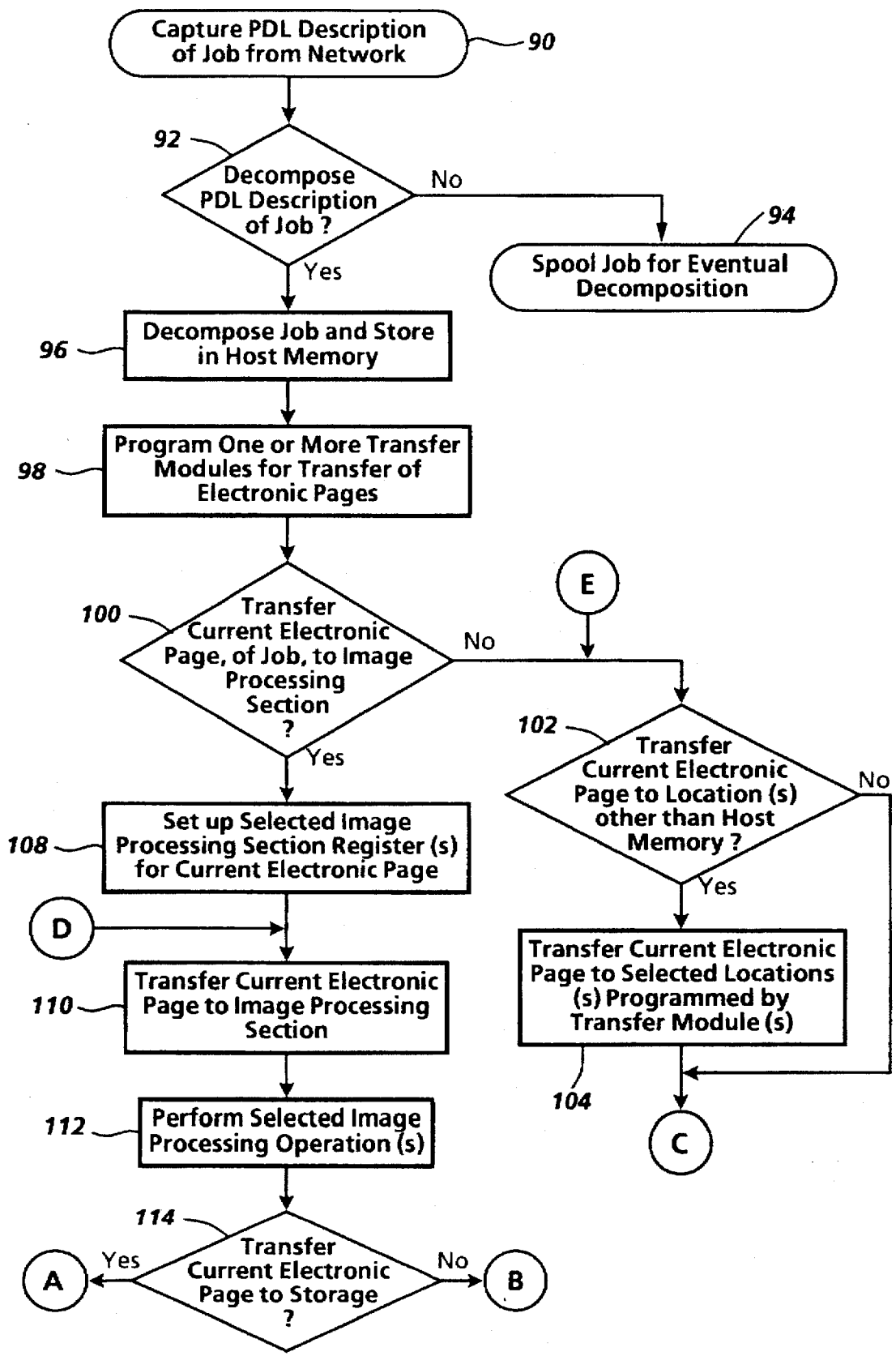
FIGS. 6 and 7 represent a flow diagram for a loopback image processing method of the present invention.
Figure 7:
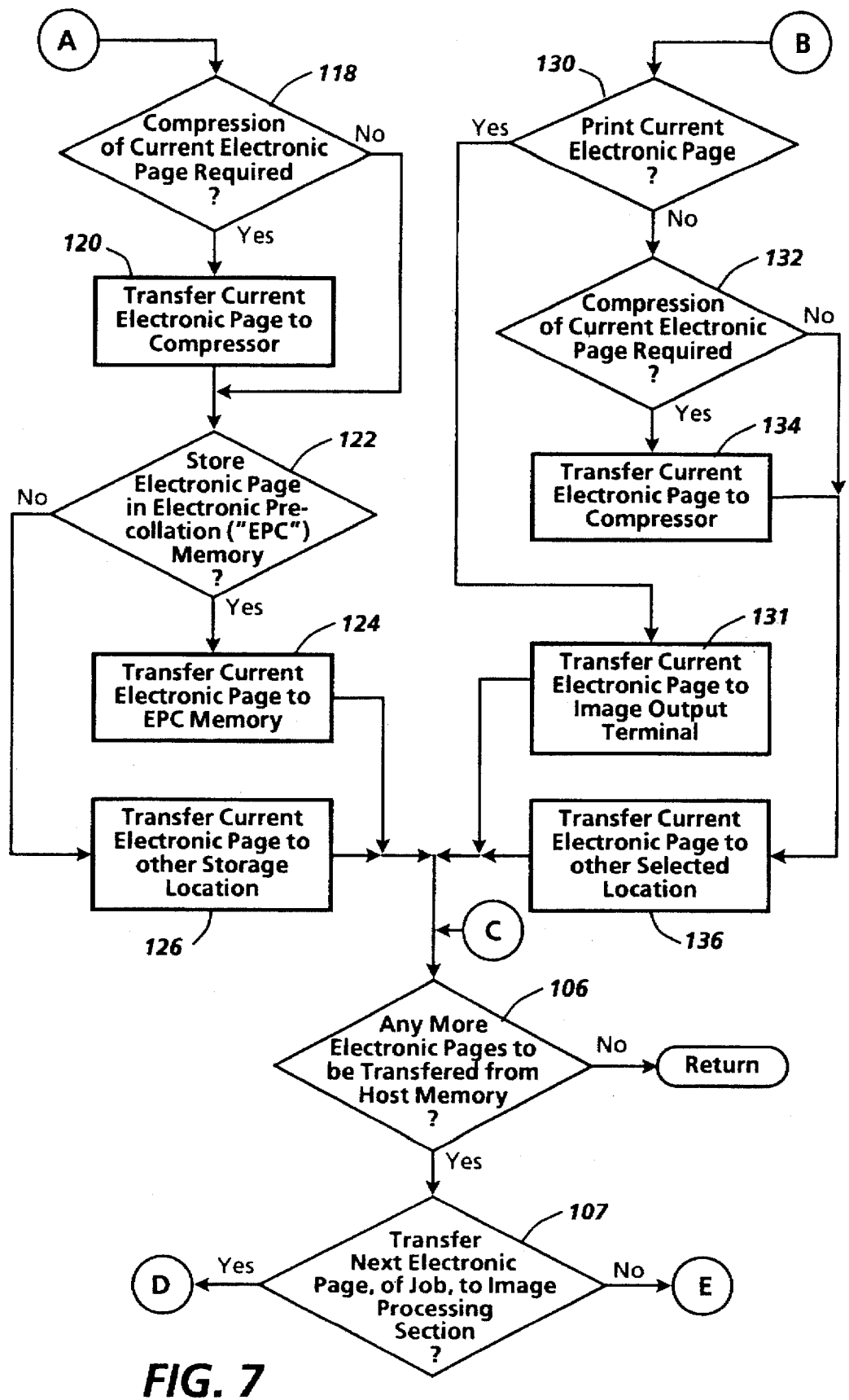

If the decision at step 122 is in the positive, then the process proceeds to step 124, where the current electronic page is transferred to the EPC memory, and then to step 106, where a check is made to determine if any more electronic pages exist, for the job, in the host memory 74. If the decision at step 122 is in the negative, then the current electronic page is transferred to a designated storage location other than the EPC memory (step 126), such as the host memory 74, and the process proceeds to step 106. Assuming that the current electronic page is not going to be stored, it is determined, at step 130, whether the current electronic page is to be printed. If the current electronic page is to be printed, then the same is transferred to the printer 20 for marking (step 131), otherwise, it is determined, at step 132, whether the current electronic page is to be compressed. As mentioned above, if an electronic page is not printed, then, typically, it is compressed. Assuming compression is required, the process proceeds to step 134, otherwise a transfer of the current electronic page to another location is performed directly at step 136. In either case, the process proceeds eventually to step 106. If all of the electronic pages in the host memory have been read, then the routine of FIGS. 6 and 7 is ended through a return. If, on the other hand, more pages need be transferred, then the process proceeds to step 107 where a next current electronic page is either processed or, if necessary, transferred away from host memory to another storage location or an output device.

Figure 8:
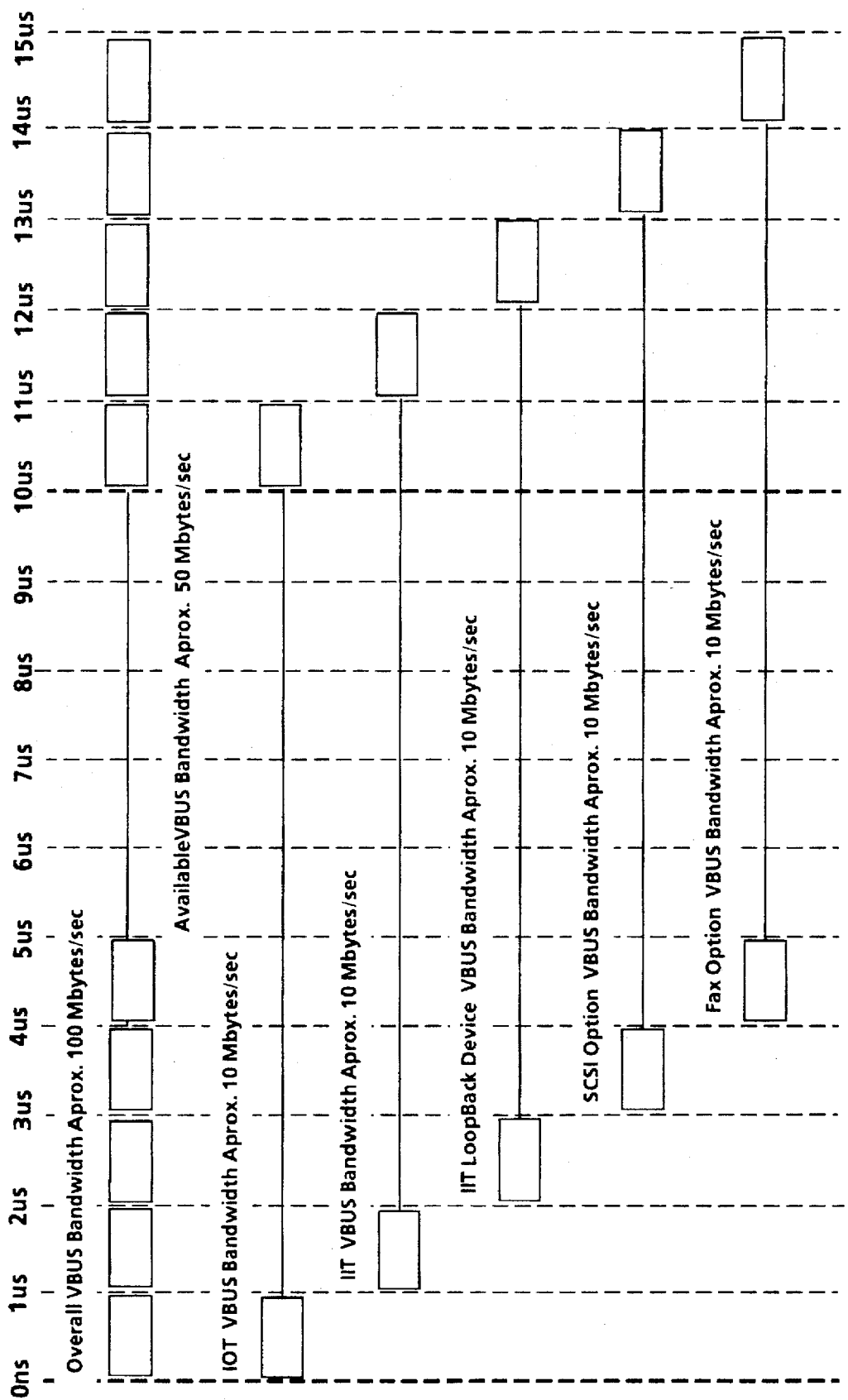
FIG. 8 is a timing diagram depicting a manner in which a plurality of bus masters can share a video bus, of the printing machine of FIG. 1, in a time-shared manner.

Referring to FIG. 8, another aspect of operation of the above described printing system is discussed. The illustrated timing diagram of FIG. 8 shows how each bus master on the Vbus 28 shares the available bandwidth by time multiplexing the high speed bus and sending a fragment of a job or image file every time the bus master has access to the bus. Each time one of the bus masters receives a grant of the bus, via the arbiter 70, the bus master sends a packet of information on the bus while it continues to receive data from its respective interface. Packet sizes are programmable in sizes ranging from 4 bytes to 64 bytes per packet. In the example of FIG. 8, each device requires approximately 10 Mbytes/sec of bandwidth from the Vbus. When bus masters, each having a bandwidth requirement of 10 Mbytes/sec, are concurrently using the bus, the total bandwidth used on the bus is 50 Mbytes/sec. This leaves approximately 50 Mbytes/sec available bandwidth left on the bus. The remaining bus bandwidth can be used by any other bus masters wishing to transfer data on the Vbus. The large amount of available bandwidth also eliminates any contention problems which can arise with an over-utilized bus.

Referring to both FIGS. 2 and 8, it will be appreciated that the above-described multiplexing permits at least two jobs to be processed within a relatively brief time interval. For all intents and purposes, it would appear to a printing system user that the jobs were being operated on simultaneously. More specifically, a first job could be stored in the EPC memory 24 and a second job could be stored in the host memory 74. As soon as an image data packet of the second job is buffered in the packet buffer of transfer module 36e, a packet of image data from the first job can be delivered to the printer 20, by use of transfer module 36d, concurrently with image data being delivered to the image processing section 22. As will be further appreciated, by reference to FIG. 8, copies of packets of the first job could be delivered to various other bus masters in a time-sharing or multiplexed fashion.

Figure 9:
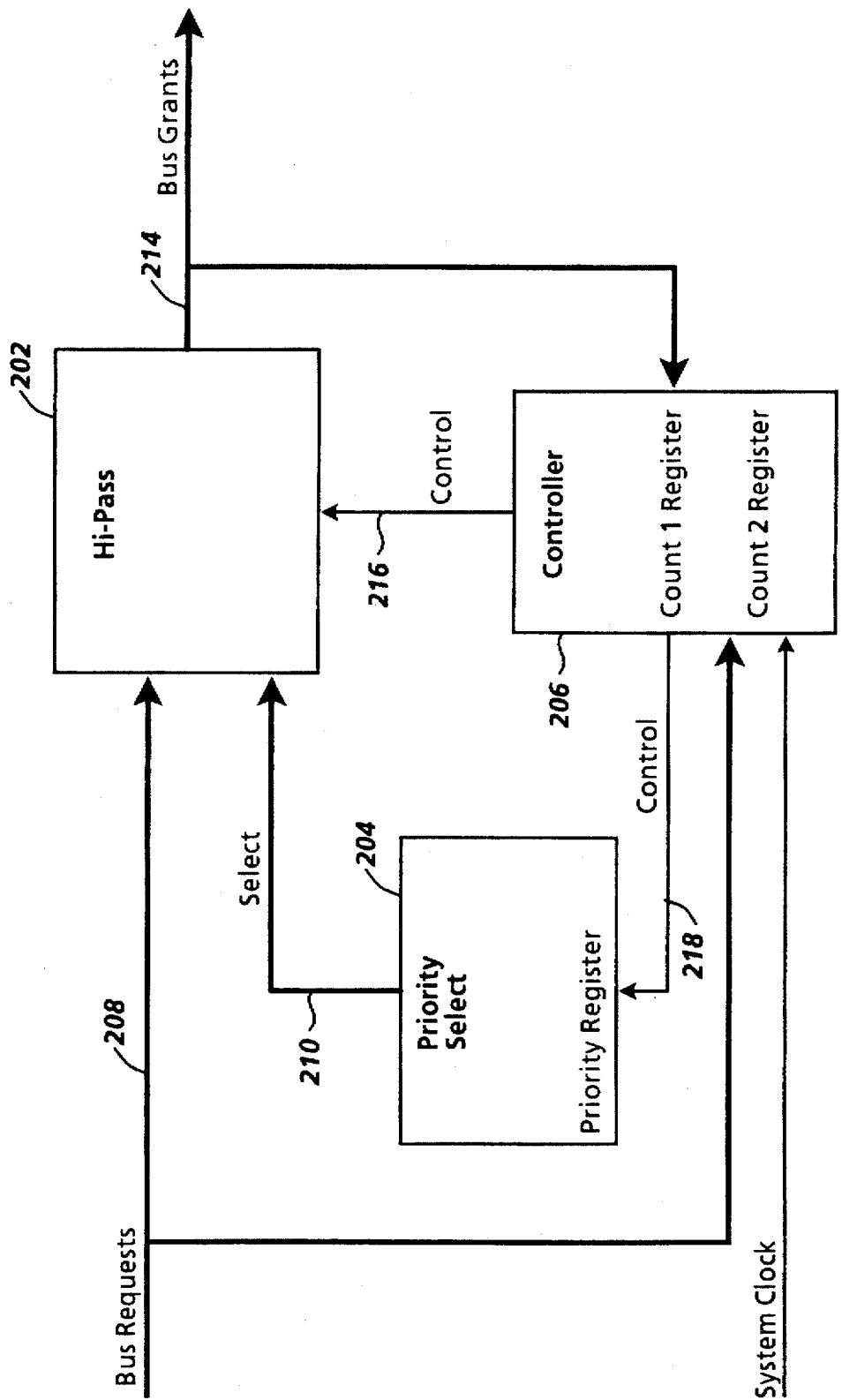
FIG. 9 is a block diagram of an arbiter used in the video control module of FIG. 2.

Referring now to FIG. 9, the VBus arbiter 70 is discussed in further detail. The VBus arbiter includes a hi-pass circuit 202, a priority select circuit 204 and a controller 206. As shown in the illustrated embodiment of FIG. 9, the hi-pass circuit 202 communicates with the bus masters of the printing system by way of a bus request bus 208 and receives select signals by way of a select bus 210. Additionally, the controller 206 is provided with feedback information, regarding incoming bus requests, from bus 208, and a currently latched bus grant, from a bus 214. Finally, the controller 206, which includes count registers, the significance of which will be discussed in further detail below, transmits control signals to the hi-pass circuit and priority select circuit by way of control lines 216 and 218, respectively.

Figure 10:
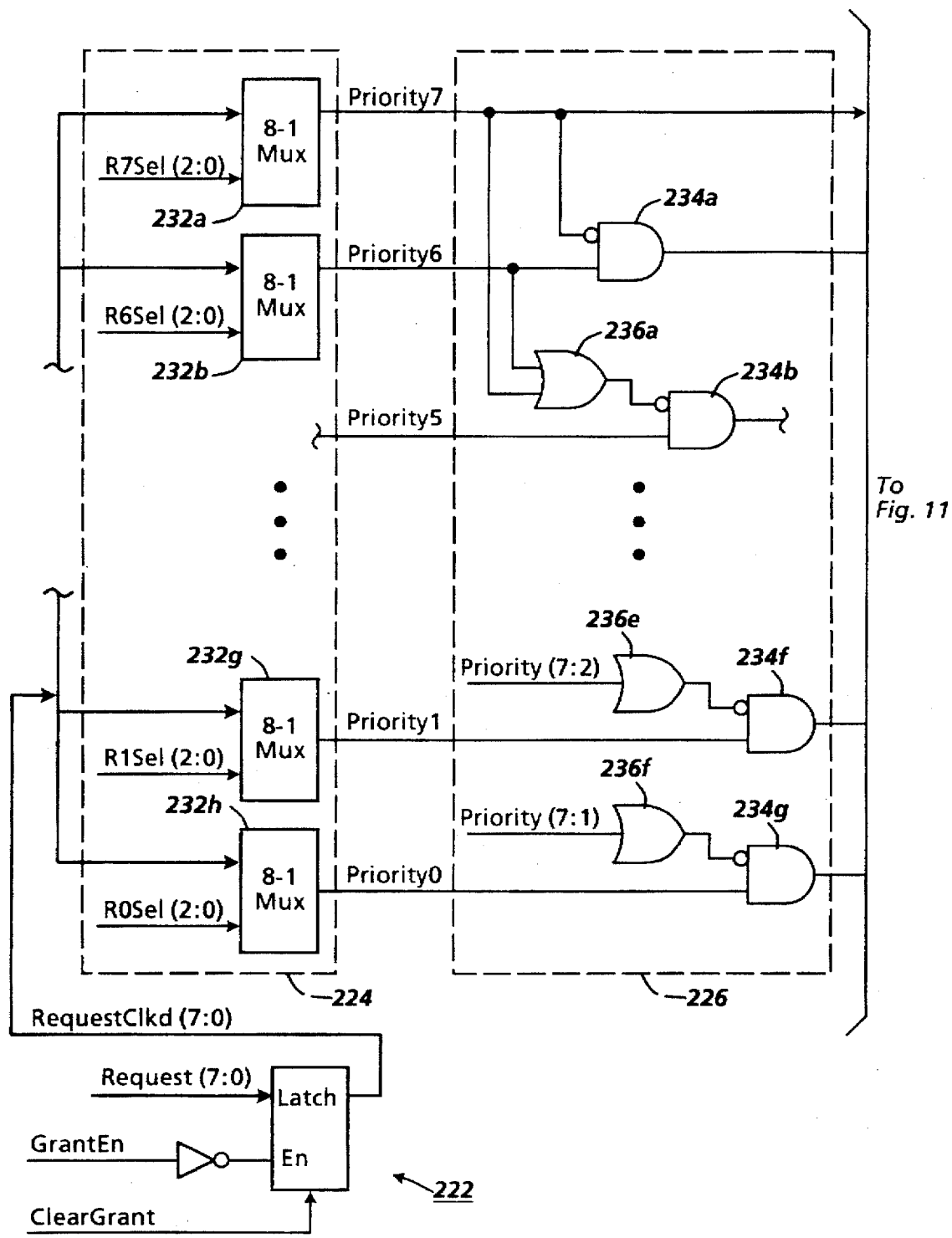
FIG. 10 is a schematic representation of a logical network used to implement a first part of a high-pass circuit in the arbiter of FIG. 9.

Referring specifically to FIG. 10, the hi-pass circuit 202 is discussed in further detail. The hi-pass circuit includes a first latch 222, a first steering circuit 224, a filtering circuit 226, a second steering circuit 228 and a second latch 230. More particularly, the steering circuit includes, in the illustrated embodiment of FIG. 10, eight N to 1 multiplexers designated by the numerals 232a, 232b, . . . 232h. While the currently disclosed arbiter is constructed to accommodate eight bus masters, it will be appreciated that the disclosed implementation is readily scalable for more or less than eight bus masters. Each of the multiplexers 232 receives a select signal, from the priority select circuit, and each select signal defines which 8 bit bus request signal will cause a given multiplexer to output a high or low signal. It will be be appreciated that the functionality of the first steering circuit could be achieved with a wide variety of logical components other than a set of multiplexers.

The output of each multiplexer 232 is coupled with a priority line referred to in the form of "PriorityN". N of the priority lines are connected to respective and gates, designated by the numerals 234a, 234b, . . . 234g, while N-1 of the priority lines are coupled with or gates, designated by the numerals 236a, 236b, . . . 236g. The Priority7 line communicates with both multiplexer 238a and an inverted input of the and gate 234a. The Priority 6 and Priority 7 lines communicate with the or gate 236a, while the output of the or gate 236a and the Priority 5 line communicate with the and gate 234b. The logical implementation used with the Priority (7:6) and Priority 5 lines is applied similarly for each set of Priority (N:1, N-1) and Priority N-1 lines in the filtering circuit 226. For example, the Priority1 line is anded with the inverted output of or gate 236g, the or gate 236g communicating with all of the priority lines except the Priority0 and Priority1 lines.

At this time, the functionality of both the first steering circuit and the filtering circuit can be fully comprehended by way of a first example. In operation, request signals for up to eight bus masters are received at the first latch. As will appear, the first latch is not necessary for the suitable operation of hi-pass 202. Various three bit select signals, namely R0Sel (2:0), R1Sel (2:0), . . . R7Sel (2:0) are set to map the priority paths with a selected bus master ordering. In the present first example of an eight bus master implementation, the bus masters are grouped in the following descending order: M0 (i.e. bus master 0), M2, M3, M5, M6, M4, M7 and M1. Accordingly, M0 is mapped with R7Sel (2:0), M2 is mapped with R6Sel (2:0), M3 is mapped with R5Sel (2:0) and so on. Additionally, each bus master is assigned a three bit value corresponding with its numerical indicator. For instance, M0 would correspond to 000, M2 to 010, M3 to 011 and so on.

In accordance with the present first example, the respective values of R7Sel (2:0), R6Sel (2:0), R5Sel (2:0), R4Sel (2:0), R3Sel (2:0), R2Sel (2:0), R1Sel (2:0) and R0Sel (2:0) would be 000, 010, 011,101, 110, 100, 111 and 001. For a case in which M0, M3 and M7 sought access the VBus 28 simultaneously, the respective request signals for M0, M3 and M7 would be steered to multiplexers 232a, 232c and 232g. While each of the Priority1, Priority5 and Priority7 lines are activated, with a 1, only the request signal for M0 is permitted to pass through filtering circuit 226. This is because an active signal will appear at each of or gates 236a–236f and cause the corresponding and gates 234b–234g to output a low signal.

Figure 11:
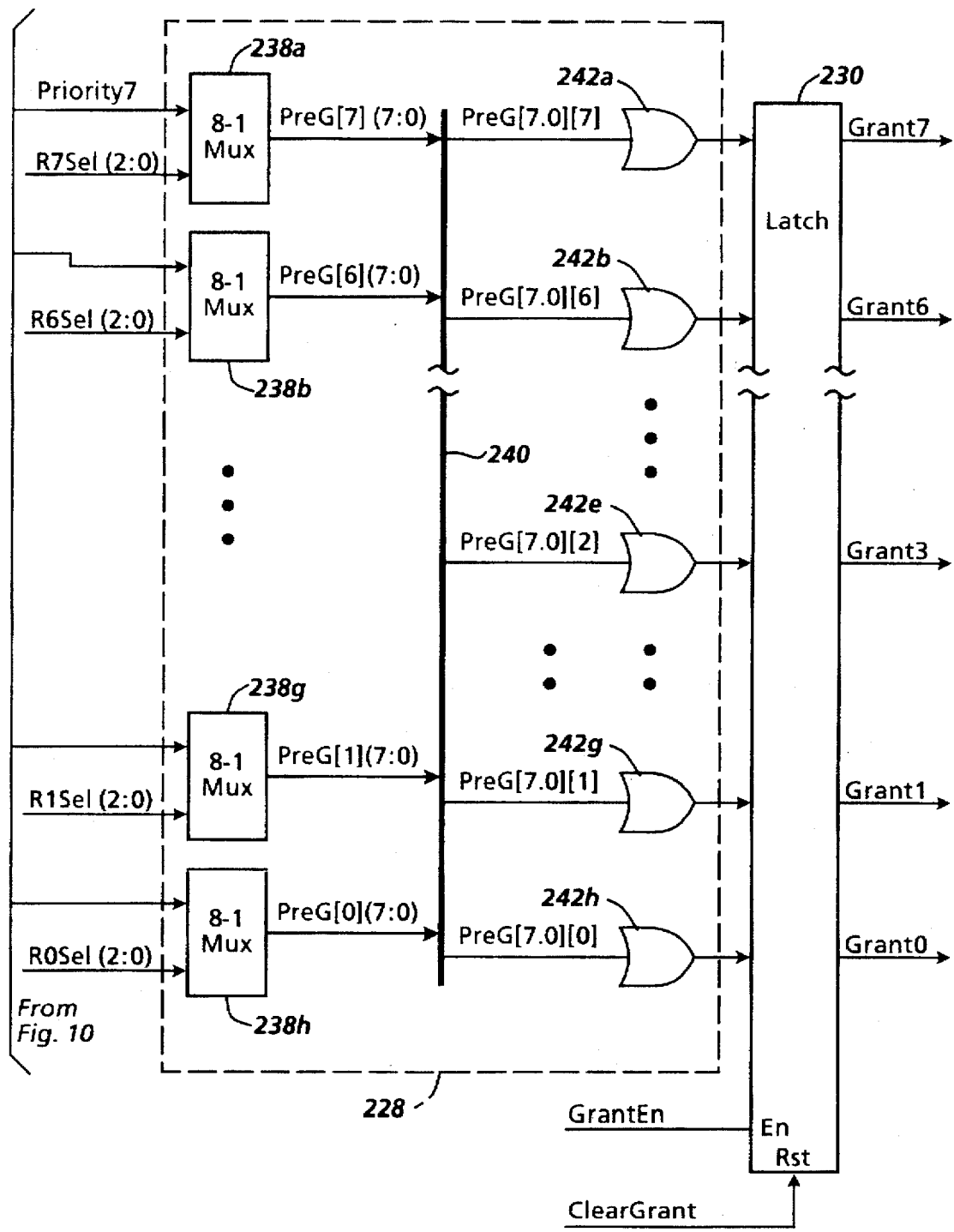
FIG. 11 is a schematic representation of a logical network used to implement a second part of the high-pass circuit in the arbiter of FIG. 9.

Referring to FIGS. 10 and 11, the outputs of the and gates 234a–234g are directed respectively to the second steering circuit 228, or, more specifically to eight 1 to N multiplexers 238a, 238b, . . . 238h. In the illustrated embodiment of FIG. 11, each multiplexer 238 forms an eight bit word, based on the state of its respective priority line, which, in turn, is transmitted to a 64 bit wide bus 240. Each bit of each 8 bit word is then transmitted, along a unique line of the bus 240 to a unique one of a plurality of or gates 242a, 242b, . . . 242h. Preferably, the eight bits associated with the Priority7 line are transmitted to the eight or gates in an order starting from the least or most significant bit, the eight bits associated with the Priority6 line are transmitted to the eight or gates in a similar order and so on for the other priority lines. In the above first example, with the Priority7 line active, the word 00000001 would be formed. A 1 would be transmitted to or gate 242h while 0s would be transmitted to all the other gates 242. Additionally, no gate, except for or gate 242h, would receive a 1 since each word from the multiplexers 238b–238h would be 00000000.

The outputs of the or gates 242 are communicated to the second latch 230. The outputs of the or gates 242 correspond with a selected bus order, which, in the first example follows a descending order starting with bus master 7 (i.e. M7). In the illustrated embodiment of FIG. 11, the output of or gate 242a is mapped to a grant signal for M7, the output of the or gate 242b is mapped to the grant signal for M6 and so on.

In the above first example, the only active signal was obtained from or gate 242h, via the least significant bit of 00000001, so a bus grant signal for M0, namely Grant0 is latched and held active until a bus cycle for M0 is complete. In a second example, M0 would relinquish the bus and the request signals for M3 and M7 would still be active. At this time, the word 00000100 would be developed at multiplexer 238c. In turn, the 1 from the third least significant bit would show up at the or gate 242f so that Grant3 would be latched.

Referring back to the functionality of latch 222, this component is provided to avoid "race" conditions. For instance, in the above first example, a request for M2 could arrive at the hi-pass 202 just as the second latch is ready to latch Grant3. Depending on the throughput rate of the circuits 224, 226 and 228, the request for M2 could just "beat out" the request for M3. This sort of race condition may be eliminated by "throttling" the request signals, with the latch 222, as the second latch is about to latch a request signal. In another example, the first latch 22 could be eliminated by specifying a set-up time on the request lines.

Preferably, the first latch 222 serves a second purpose, namely to prevent request signals from accessing the first steering circuit 224 while a grant signal is enabled. In particular, referring to FIGS. 10–12, the controller 206, which communicates with the second latch 230, includes controller logic 246. Pursuant to latching a grant signal, the controller logic transmits a grant enable signal (GrantEn) to the first latch 222 and the second latch 230. The grant enable signal is inverted at the first latch 222, however, so that incoming request signals are blocked thereat. As a bus master relinquishes the VBus, the controller logic detects the accessibility of the VBus and transmits a ClearGrant signal to both the first and second latches so that another grant signal can be latched.

Figure 12:
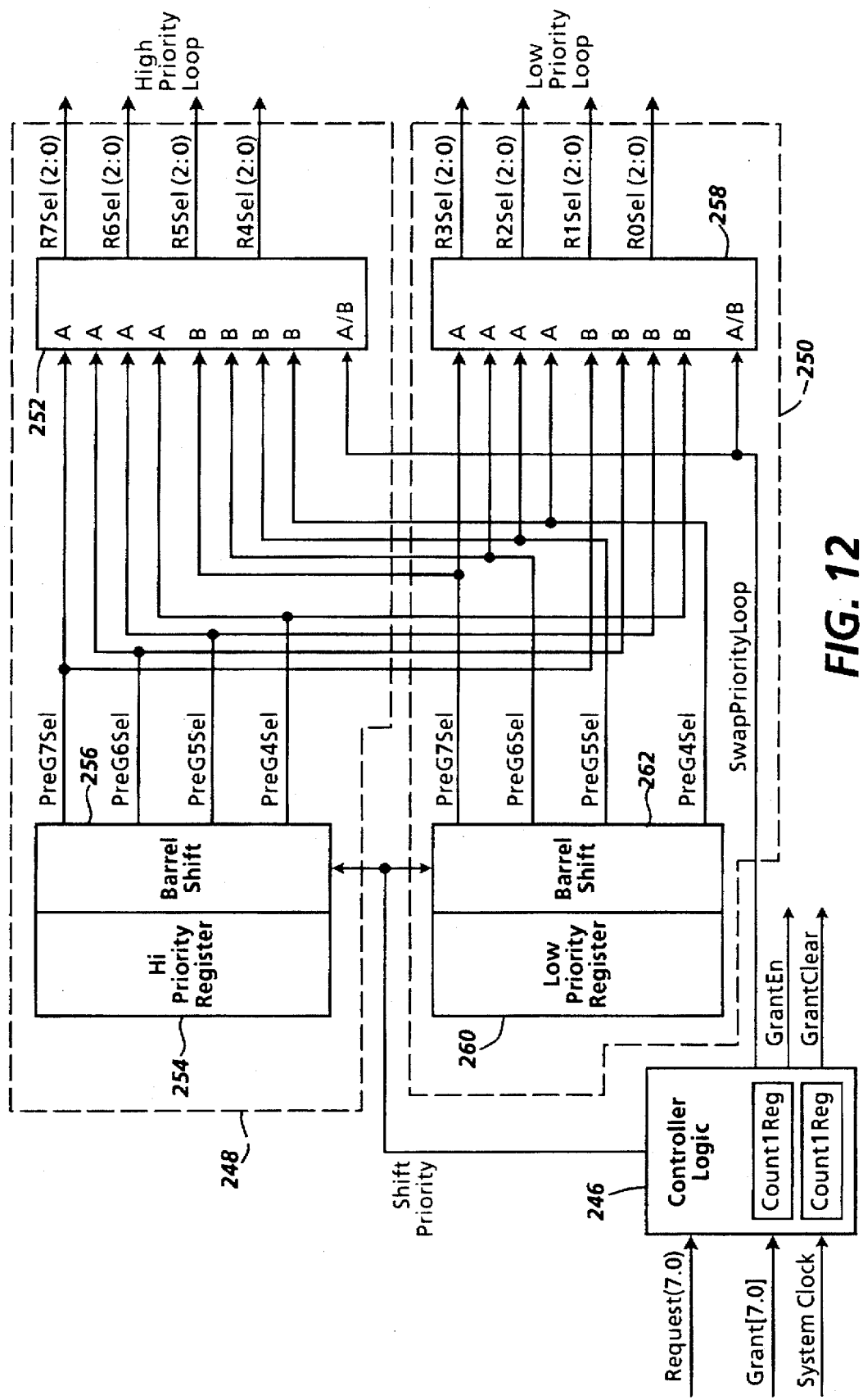
FIG. 12 is a schematic representation of a logical network used to implement priority select and controller circuits in the arbiter of FIG. 9.

Referring to FIG. 12, the process of generating select signals for the first steering circuit 224 is discussed in further detail. The illustrated priority select circuit 204 includes a first priority select signal generating circuit 248 and a second priority select signal generating circuit 250. In practice, the circuits 248, 250 are identical in structure and the first circuit 248 is normally given a higher priority than the second circuit 250. The first circuit 248 includes a first bank of 2:1 multiplexers 252 operatively coupled with both a first register 254 and a first barrel shifter 256. The second circuit 250 includes a second bank of 2:1 multiplexers 258 operatively coupled with both a second register 260 and a second barrel shifter 262. As shown, each multiplexer bank includes a set of "A" inputs and a set of "B" inputs. Preferably, the controller logic 246 provides a high signal (e.g. a "1") or a low signal (e.g. a "0"), via a SwapPriorityLoop line, to an input designated by the notation A/B(Sub-Bar) indicating that the A inputs are activated with a 1 and the B inputs are activated with a 0. While the first circuit 248 is preferably given priority over the second circuit 250, circuit priority can be reversed by simply shifting the state of the signal to the A/B(Sub-Bar) input.

In one example, four three bit signals, corresponding respectively to four bus masters, are stored in each of the registers 254, 260 in a preselected order. As will be appreciated, the number of registers can be scaled readily so that signals for more than eight bus masters can be developed. Preferably, the order of the bus master related signals may be selectively shifted, in at least one of the registers, during a period in which the GrantEn signal is active, so that the priority select circuit operates in a dual "round robin" fashion. This shifting is accomplished through use of a Shift Priority line. In one example, as will appear below, the order of the signals in at least one of the registers is repositioned by alternating the state of the signal across the Shift Priority line. Additionally, the outputs of the barrel shifters are designated in the form of PreGNSel (Y:0) and the outputs of the multiplexer banks are designated in the form RNSel (Y:0), where, in one example, N=0:7 and Y=2.

Operation of the priority select circuit 204 can be understood by way of a second example that parallels the above-described first example. In the second example, signals for the bus masters M0, M2, M3 and M5 are loaded initially into the first register 254 so that PreG7Sel (2:0), PreG6Sel (2:0), PreG5Sel (2:0) and PreG4Sel (2:0) are 000, 010, 011 and 101, respectively. Additionally, M6, M4, M7 and M1 are loaded initially into the second register 260 so that PreG3Sel (2:0), PreG2Sel (2:0), PreG1Sel (2:0) and PreG0Sel (2:0) are 110, 100, 111 and 001, respectively. Assuming that a 1 is transmitted across the SwapPriorityLoop line, then the signals across PreG7Sel (2:0), PreG6Sel (2:0), PreG5Sel (2:0), PreG4Sel PreG3Sel (2:0), PreG2Sel (2:0), PreG1Sel (2:0) and PreG0Sel (2:0) are transmitted to $A_7$, $A_6$, $A_5$, $A_4$, $A_3$, $A_2$, $A_1$ and $A_0$, respectively. In turn the three bit words corresponding to $A_7$, $A_6$, $A_5$, $A_4$, $A_3$, $A_2$, $A_1$ and $A_0$ are conveyed to R7Sel (2:0),R6Sel (2:0), R5Sel (2:0), R4Sel (2:0), R3Sel (2:0), R2Sel (2:0), R1Sel (2:0) and R0Sel (2:0), respectively. It should be appreciated that when a 1 is transmitted across the SwapPriorityLoop line, the four bus master signals of the first register 254 are mapped to select signals having a higher priority than the resulting select signals of the four bus master signals of the second register 260.

On the other hand, if a 0 is transmitted across the SwapPriorityLoop line, then the signals PreG3Sel (2:0), PreG2Sel (2:0), PreG1Sel (2:0) and PreG0Sel (2:0) are transmitted to $B_7$, $B_6$, $B_5$, $B_4$, respectively, while the signals PreG7Sel (2:0), PreG6Sel (2:0), PreG5Sel (2:0) and PreG4Sel (2:0) are transmitted to $B_3$, $B_2$, $B_1$, $B_0$, respectively. In turn, the three bit words corresponding to $B_7$, $B_6$, $B_5$, $B_4$, $B_3$, $B_2$, $B_1$ and $B_0$ are conveyed to R7Sel (2:0),R6Sel (2:0), R5Sel (2:0), R4Sel (2:0), R3Sel (2:0), R2Sel (2:0), R1Sel (2:0) and R0Sel (2:0), respectively. It should be appreciated that when a 0 is transmitted across the SwapPriorityLoop line, the four bus master signals of the second register 260 are mapped to select signals having a higher priority than the resulting select signals of the four bus master signals of the first register 254.

Referring still to FIG. 12, the controller logic 246 includes a first count register (Count1 Reg) and a second count register (Count2 Reg). The first count register keeps track of how many consecutive times the bus masters of the first register 254 are granted access to the VBus 28 (FIG. 2), while the second count register keeps track of how many consecutive times the bus masters of the second register 260 are granted access to the VBus. Preferably, the controller logic uses the count registers to control both the Shift Priority and the SwapPriorityLoop lines. In one instance, the controller logic will cause a swap of the registers 254, 260 after a preselected number of bus masters of the first register 254 have been granted access to the VBus. Conversely, after a preselected number of the bus masters of the second register 260 have been granted access to the VBus, the controller logic will swap the registers again, provided a low priority request is pending. Additionally, the count registers can be used to program shift timing of the respective bus master related signals of the registers 254 and 260.

Figure 13:
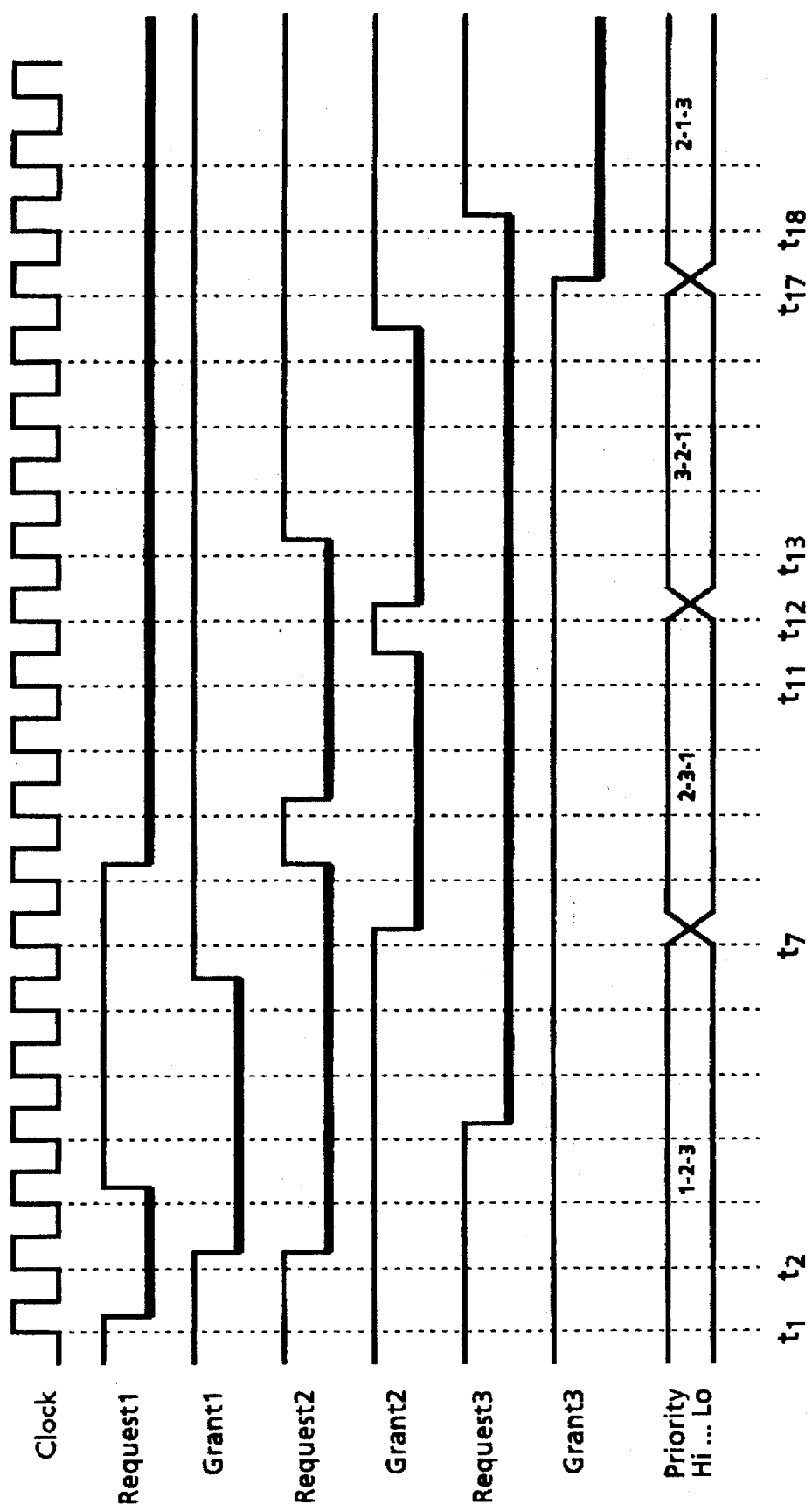
FIG. 13 is an exemplary timing diagram for the arbiter of FIG. 9.

Referring to FIG. 13, the technique of the preferred embodiment is illustrated by way of a timing diagram in which requests for three bus masters, whose related priority signals reside in, for example, the first register 254 are arbitrated. It will be noted that for the example of FIG. 13, requests and grants are expressed in terms of active lows. This is in contrast to the discussion above which placed an emphasis on the use of active highs. As will be appreciated by those skilled in the art, the logical implementation of the currently disclosed embodiment could be implemented with active highs or active lows without affecting the principles upon which the preferred embodiment is based. For purposes of relating the illustrated embodiment of FIG. 13 to a third example request 1 corresponds to a request from M0, request 2 corresponds to a request from M1, request 3 corresponds to a request from M2, while M0, M1 and M2 are loaded into the register 254 in descending order. Referring specifically to FIG. 13, M0 requests the bus after $t_1$ and after $t_2$, M0 is granted the VBus, via Grant1. It should be recognized that since Grant1 is latched at the second latch 230 (FIG. 11), M0 need not continue its request (i.e. Request1) once Grant1 becomes active.

After Grant1 becomes inactive, the request for M2, namely Request2 is granted just after $t_7$. The request for M2 is serviced at this time because there is no pending request for M0, which has the highest current priority, and Request2 has current priority over Request3. As soon as Request2 is granted, via Grant2, the positions of the related priority signals in the first register 254 are reordered, in round robin fashion, so that M0 is shifted to the lowest priority position while M2 and M3 are moved up to the first and second priority positions, respectively. At $t_{11}$, Grant2 becomes inactive and, after $t_{12}$, Grant2 becomes active again since M2 had priority at $t_{12}$. As Grant2 issues, between $t_{12}$ and $t_{13}$, the priorities of the related priority signals, in the first register 254, are repositioned in round robin fashion. Between $t_{17}$ and $t_{18}$, M3 is finally given access to the VBus and the priorities of the related priority signals are repositioned again.

Figure 14:
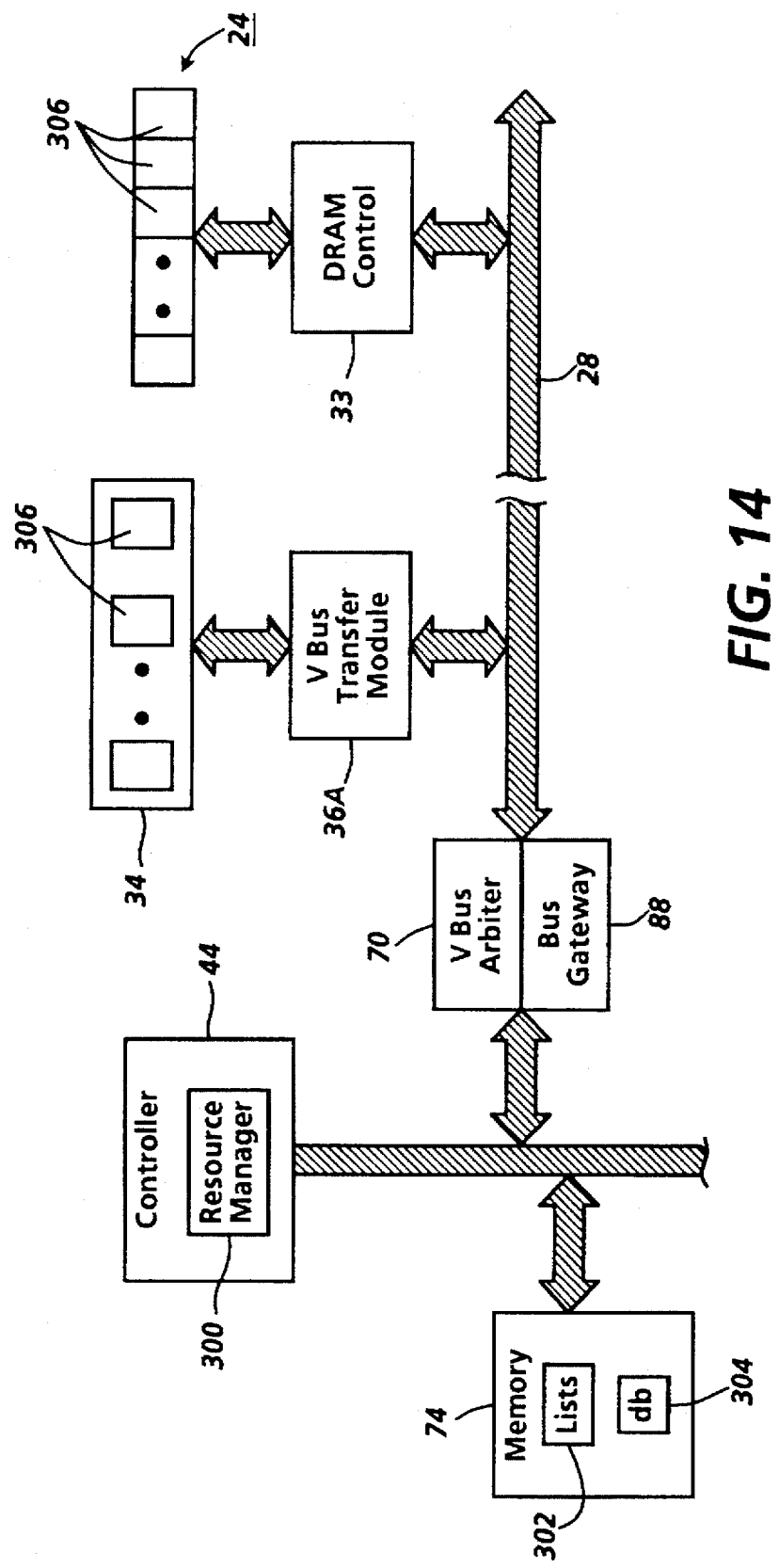
FIG. 14 is a block diagram of a resource management scheme including a selected number of components from the block diagram of FIG. 2.
Figure 15:
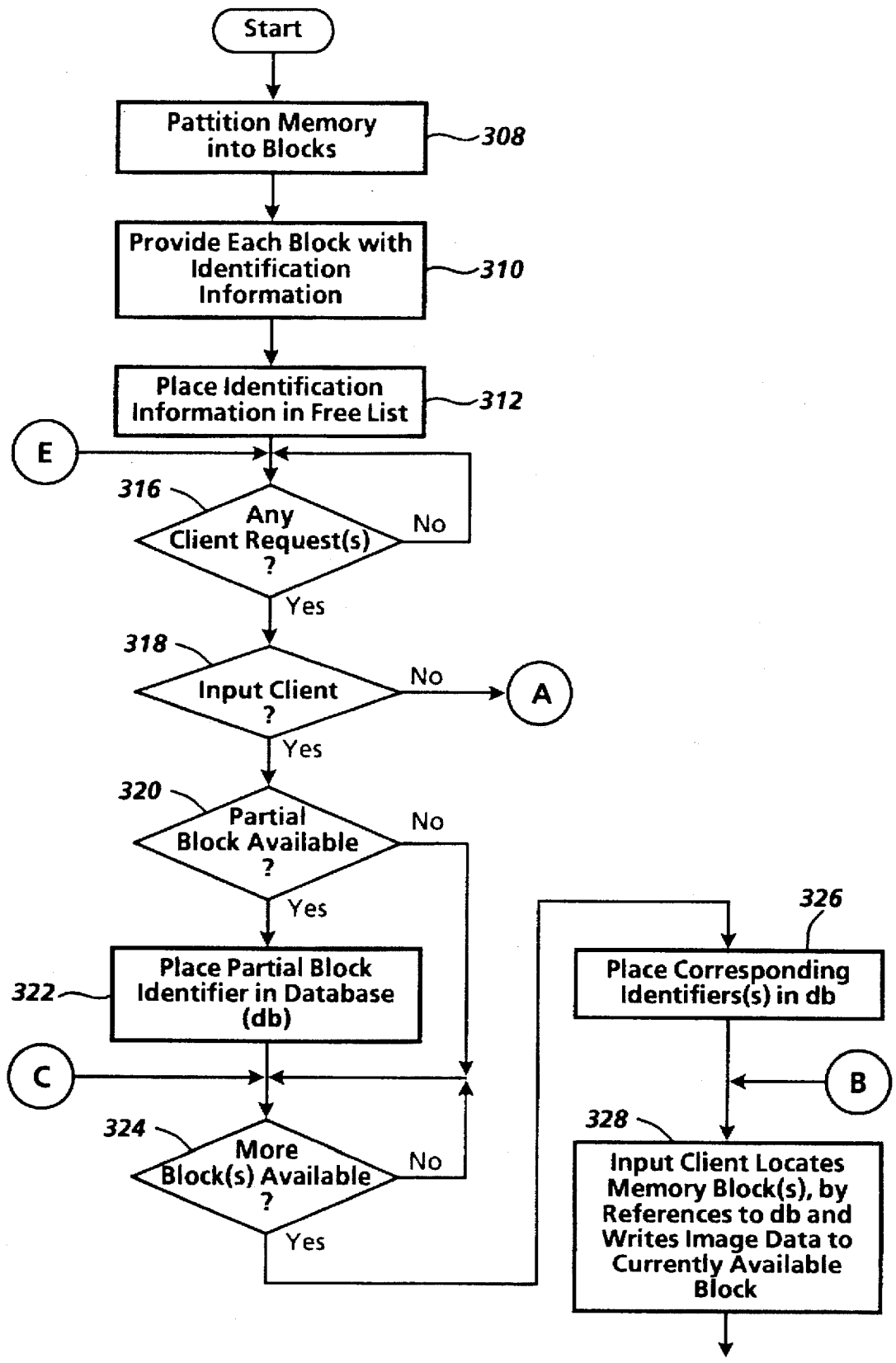
FIGS. 15–18 is a flow diagram illustrating some of the functionality of the resource management scheme of FIG. 14.

Referring to FIG. 14 a scheme for managing memory allocation, i.e. a resource management scheme, is illustrated. More particularly, the controller 44 includes a resource manager 300, while the host memory 74 includes a pair of lists 302, referred to respectively as the "free block list" and the "free partial block list", and a database ("db") 304. The resource manager is implemented by way of suitable algorithms, the details of which will be discussed in further detail below, and the significance of the lists and the database, relative to the resource management scheme, will also be discussed below. Additionally, the EPC memory 24 and the SCSI hard drive ("disk") 34 are shown as being comprised of blocks 306. A discussion of a methodology for forming and allocating memory blocks follows:

Referring to FIGS. 14–18, the algorithms for implementing the resource management scheme are discussed. Initially, at step 308, the EPC memory 24 is partitioned into a series of the blocks 306. A partitioned set of memory blocks is also shown in FIG. 19. Preferably, the block size is varied in accordance with factors, such as image size to be stored. For example, if a location generally copies complex documents which results in poorly compressed (large) image, the block size can be increased. As will appear from the discussion below, increased block size will result in fewer interrupts by a client (e.g. scanner 18) of the controller 44.

Each block is then provided with identification information (step 310), such as block ID, block address and block size, which identification information is placed, at step 312, in the free block list. Preferably, each list in the host memory 74 is a linked list of structures. At step 316, the resource management system waits for a memory request from a client. In the present context, a client is an input or output device encompassed by the printing system 10 (FIGS. 1, 2 and 5). A client initiates a request by transmitting a suitable request or interrupt signal to the controller 44. Upon receiving a request signal, the controller determines, via step 316, whether the client is an input client. If the client is an input client, then the process proceeds to step 318, otherwise the process proceeds directly to step 320 (FIG. 17) where an output client request is serviced.

Assuming the requesting client is an input client, the resource manager 300 examines the free partial block list to determine if a partial block is available for the requesting client. Referring to FIG. 20, an example of the allocation of a partial block to the beginning of an image will be discussed. In particular, at system initialization, no partial block is available for an image 1 of a job. After image data for image 1 is delivered to the memory, however, a partial, unfilled block may remain. As shown in FIG. 20, and explained in further detail below, the partially unfilled block, with its corresponding identifier is made available for use with the next image.

Returning to FIG. 15, if a partial, unfilled block is available, then it is designated with an identifier and, at step 322, placed in the db 304. Next, at step 324, the resource manager consults the free block list to determine if a nominal number of blocks are available for use by the input client. In the preferred embodiment, each client is assigned a value corresponding to the number of nominal blocks to which it is entitled. In one example, assignment is based on the processing speed of the requesting client. That is, per each request, it may be desirable to provide fast processing clients with more blocks than slow processing clients. In one situation, the nominal number of blocks to be assigned a requesting client may not be available in the free block list. In this situation, the resource manager may provide the requesting client with one or more partial blocks until a whole block becomes available.

Figure 21:
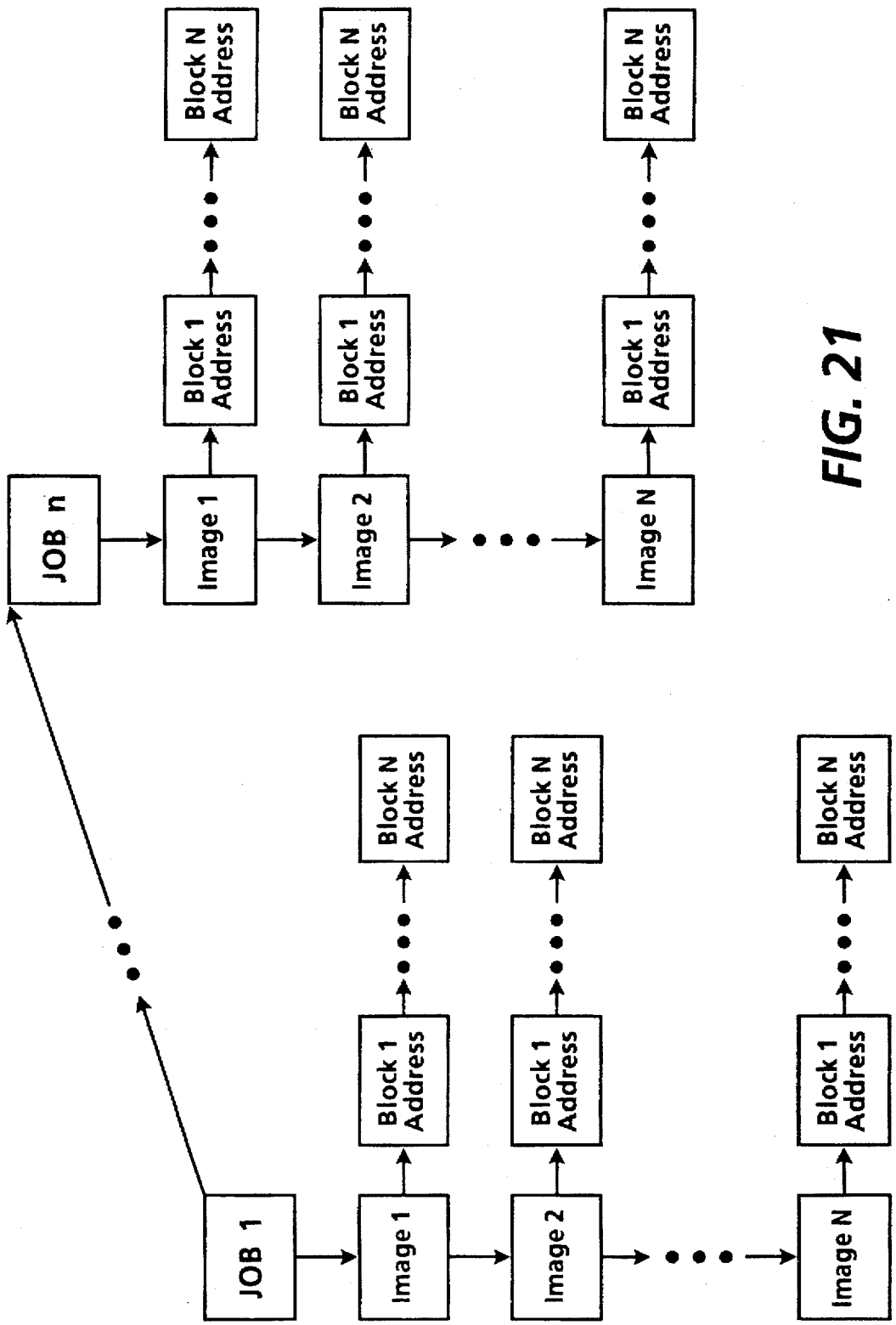
FIG. 21 is a schematic representation of a database format used in conjunction with the resource management scheme.

Assuming the nominal number of blocks is available, at step 326 the resource manager will place appropriate identifiers (i.e. information identifying both a first address and a size of each block) in the db 304. Referring to FIG. 21, a suitable database structure for use with the disclosed embodiment is shown. The database is constructed in a hierarchical scheme in which jobs are linked to images and images are linked to blocks. In one example, where the client's storable image data is associated with a first image (i.e. "Image 1") of a first job (i.e. "JOB 1"), then the first block identifier is placed at the location designated as "Block 1 Address". Subsequently, the client will access the database and, at step 328 (FIG. 15), locate the address of the first available block. The client will then, in cooperation with, for example, one of transfer modules 36, fill up the located block. When the scanner is serving as the client, the scanner will initiate a DMA transfer, with EPC memory 24, via the transfer module 36D (FIG. 2). Referring again to FIG. 19, the scanner is shown as using the EPC memory in conjunction with other clients. While the block 306A is shown as being a whole block, it will be understood that, in many instances, it would be a partial block.

Figure 22:
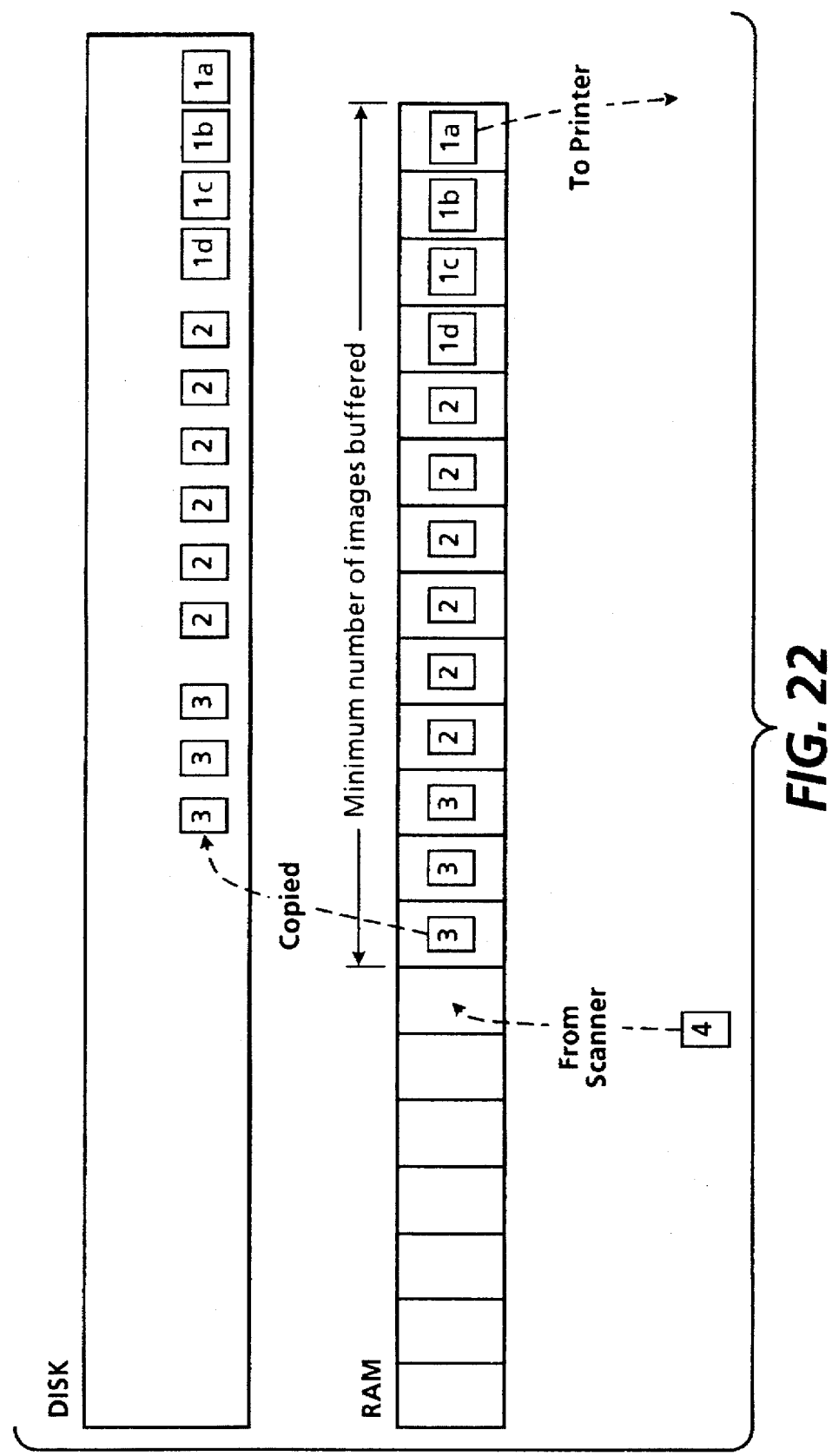
FIGS. 22–25 are schematic representations illustrating how a combination of electronic precollation (EPC) and disk memory is used in conjunction with the resource management scheme.

The printing system 10 offers the advantageous feature of storing jobs, intended to be outputted as multiple sets, on disk. In this way EPC memory can be made available to multiple clients in a relatively short time interval. Referring to step 332 of FIG. 16, when disk storage is desired, each stored block is copied to disk 34 (also see step 334). Referring to FIG. 22, a graphic representation demonstrating the relationship between EPC memory and disk is provided.

Figure 23:
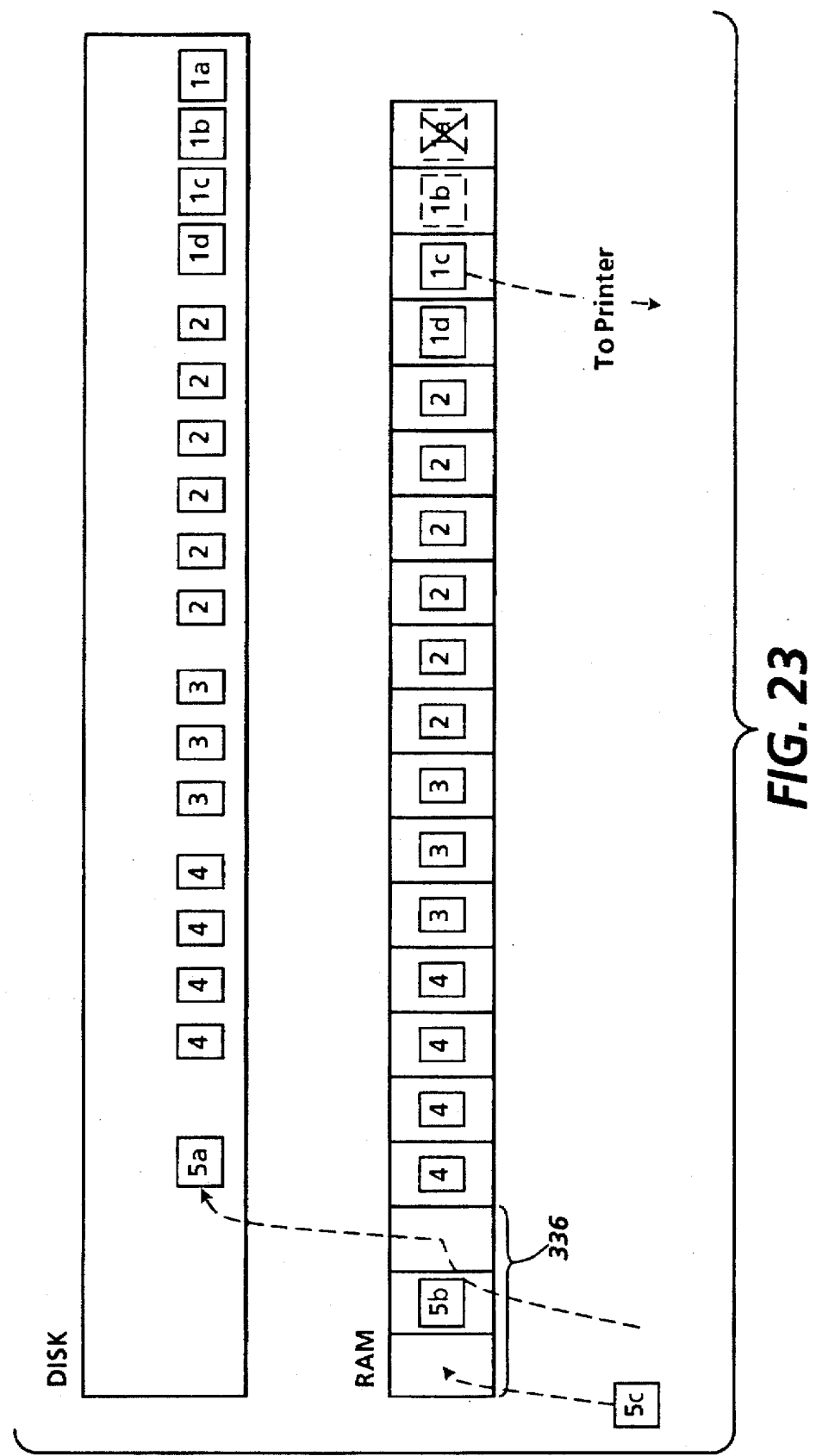

As further shown in FIG. 22, preferably, a minimum amount of input image pages, intended for printing, are buffered prior to printing. This has been found to be advantageous since a printer typically processes image data at a rate much greater than that of most input clients, such as the scanner. In the illustrated embodiment of FIG. 23, a variable buffer zone 336 is maintained for the scan client. This buffer zone is used to move image directly to disk, which enables the system to continue scanning without stopping. It will be appreciated that the variable zone can be used by clients, other than the scanner 18, to facilitate storage.

Referring again to FIG. 16, the input client transmits an interrupt signal to the controller, at step 338, when a block has been filled with image data. Alternatively, the input client could be provided, in advance, with pointers to lists of block addresses. In this way, the input client would read, without controller intervention, the locations of blocks to be used.

A determination is made at step 340 as to whether a full image has been written into EPC memory 24. Assuming that the end of the image has not been reached, it is determined, at step 342, whether another nominal number of blocks is required. It should be appreciated that, typically, when a client requires a nominal number of blocks, the resource manager provides it with a set of plural blocks. In application, those blocks follow a sequence and one of the blocks in the sequence is identified as a "relative last block" which, when reached, indicates that another set of blocks may be required. The position of the relative last block is variable in that it need not, in absolute terms, be the last block of the set. If the relative last block has not been reached, then the process loops back to step 328 where the db 304 (FIG. 14) is accessed so that the client can locate the next block to be filled. On the other hand, if the relative last block has been reached, then the process loops back to step 324 for obtaining at least a part of another block set.

Figure 16:
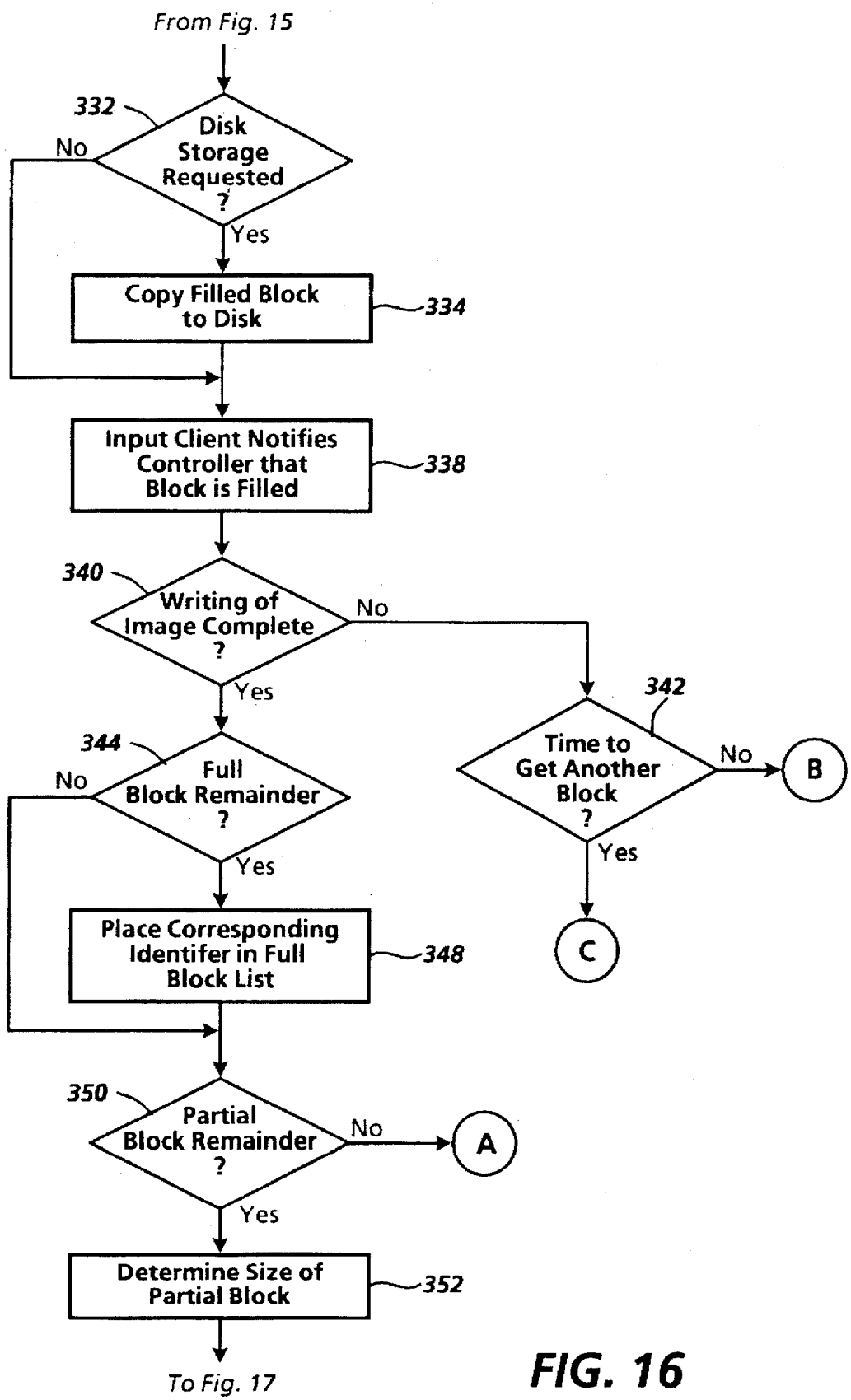
Figure 17:
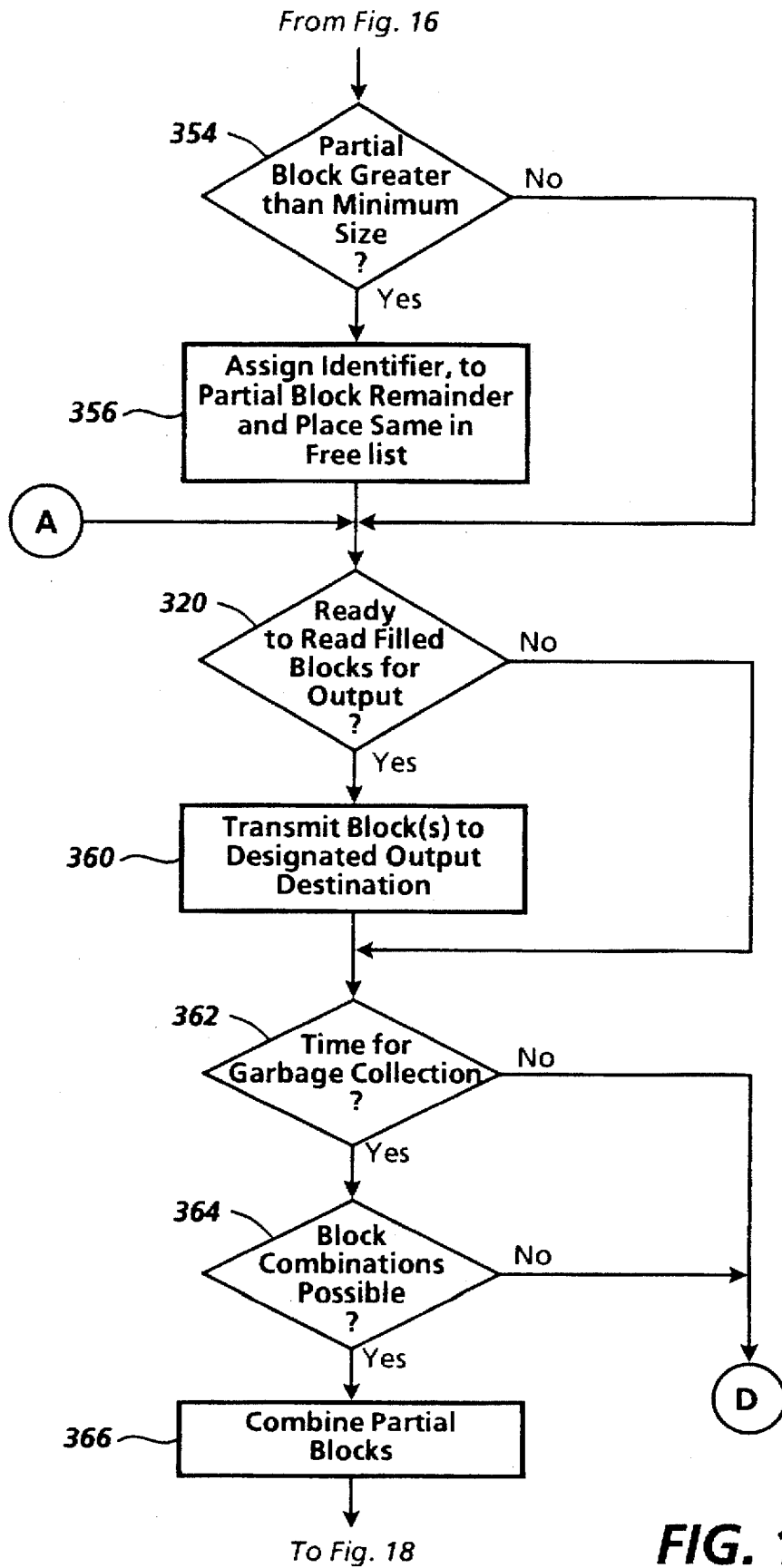
Figure 18:
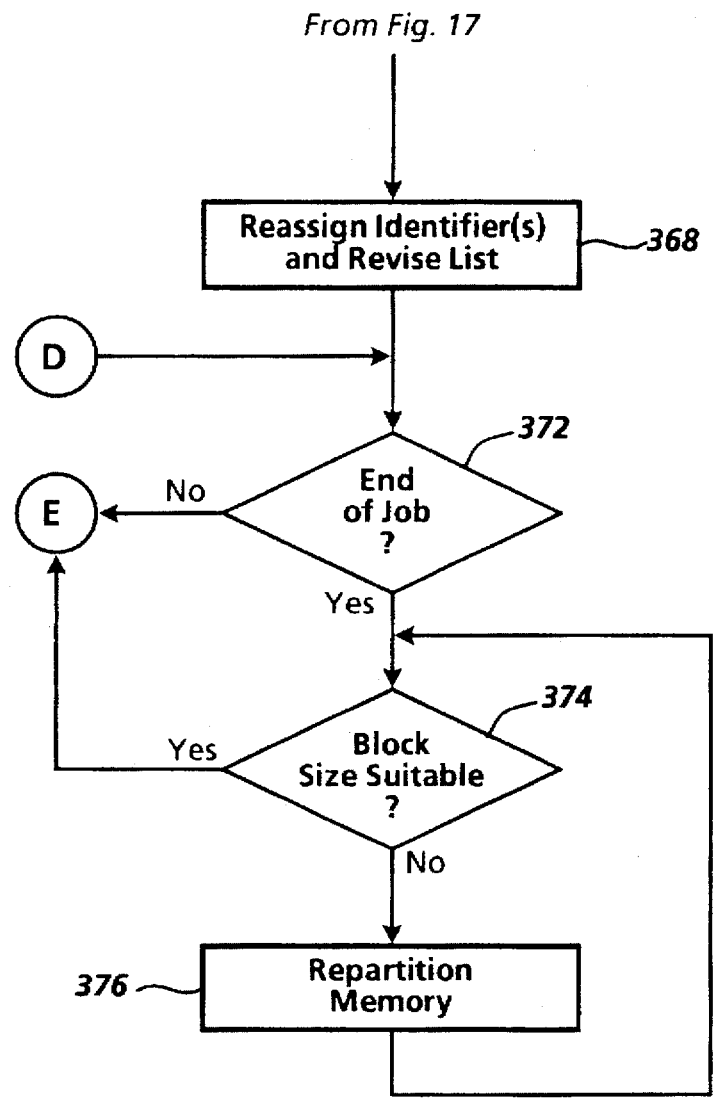

Referring still to FIG. 16, if it is determined, at step 340, that a full image has just been written into memory, then a series of steps is performed to prepare for the receiving of another image. First, the resource manager 300 (FIG. 14) determines, with step 344, if all of the full blocks have been used by the input client. If not, then the identifier of each surplus whole block is placed in the free block list (step 348), otherwise the process proceeds to step 350 where the resource manager determines if the image ends on a partial block. Referring again to FIG. 20, an example of how an image might end at a partial block is shown for the "Image 1". In the preferred embodiment, the size of the unused part of Image 1 is then determined in accordance with step 352 of FIG. 16. Referring to FIG. 17, if the size of the partial block is greater than a selected minimum size (step 354), then an identifier is assigned to the partial block (step 356) and placed in the free partial block list so that the partial block can be used to receive image data from another image, such as the "Next Image" of FIG. 20. For those cases in which a given partial block is smaller than a selected minimum, the given partial block is saved for "garbage collection", the significance of which will be described below.

At steps 320 and 360, the preferred methodology accommodates for the needs of an output client, such as a printer. Regarding step 360, the output client is preferably "told" where the image data, intended for use in outputting, resides. In this way, the output client can read the image data from the EPC memory. Additionally, as shown in FIG. 22, an output operation can be executed just before or after an input operation. It will be appreciated by those skilled in the art that the resource management scheme of the disclosed embodiment could be used with any memory component of the printing system 10. For example, the memory blocks shown in FIG. 19 could just as easily be stored in the host memory 74 as the EPC memory 24.

Figure 24:
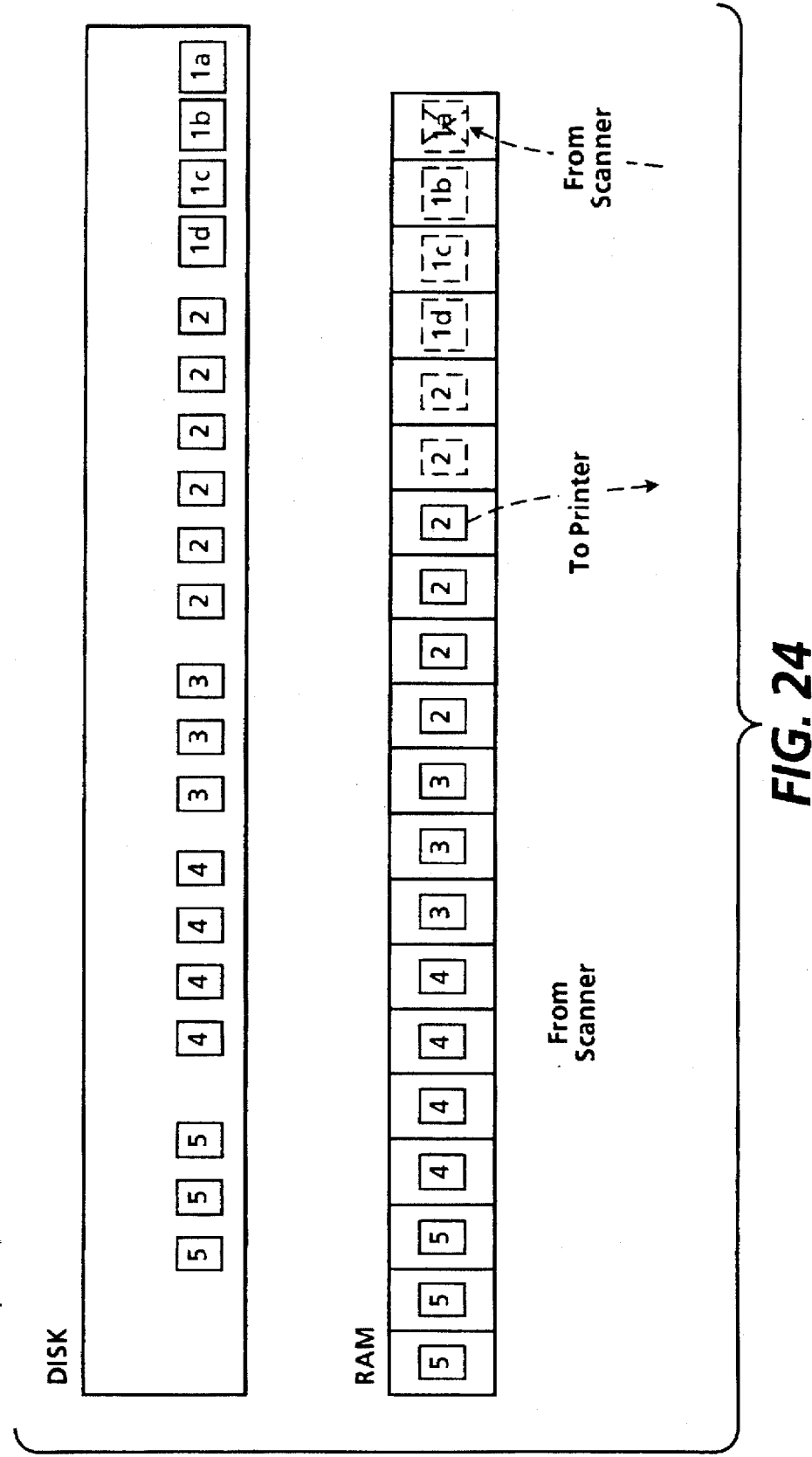
Figure 25:
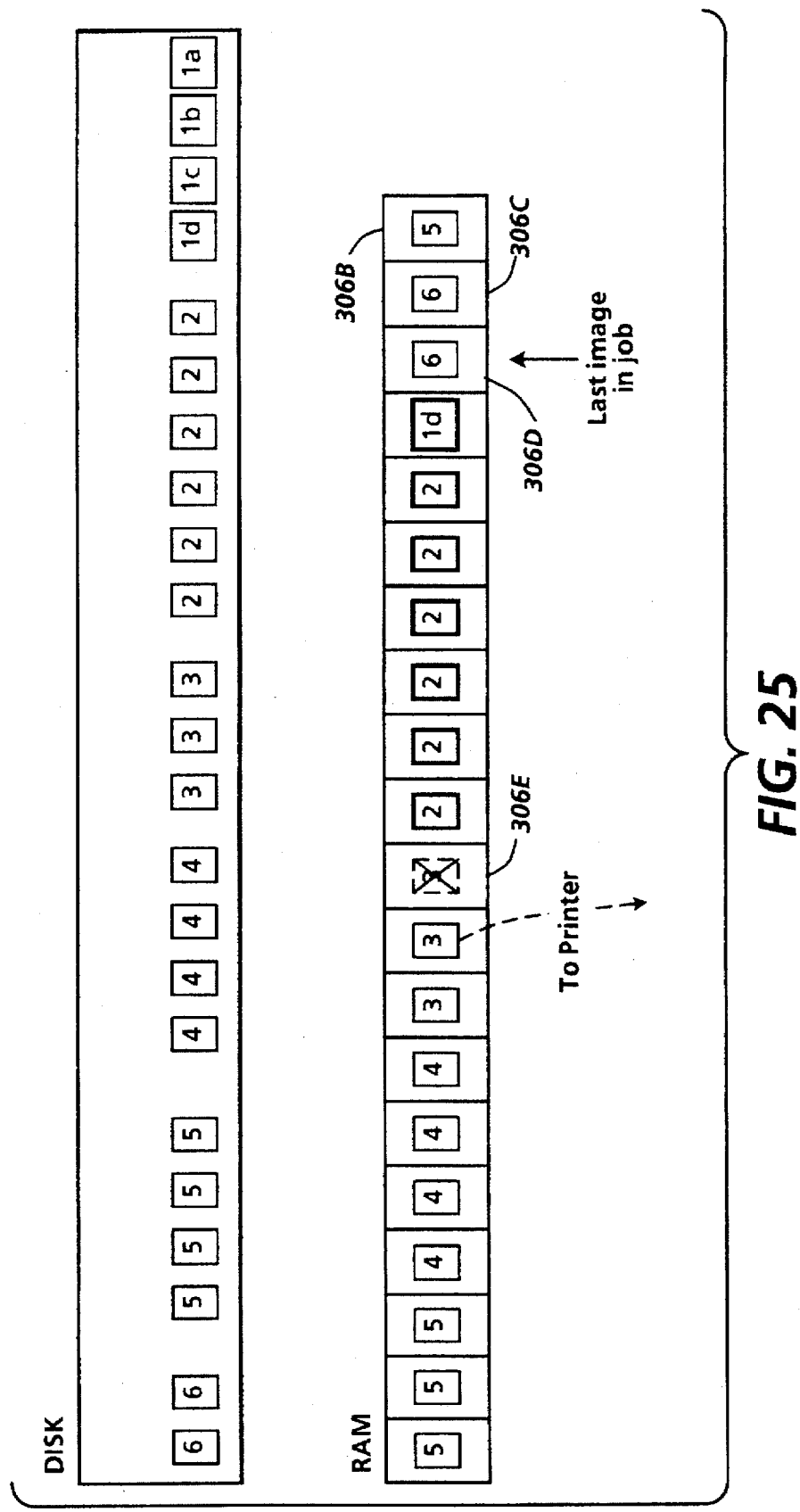

Referring to FIGS. 22, 24 and 25, an application of the the present memory management scheme, with respect to the printing client, is discussed in further detail. In the illustrated embodiments of FIGS. 22, 24 and 25, a given job, intended to be printed in multiple sets, is shown as including six images. In FIG. 22, the first three images are buffered and copied to disk. In FIG. 24, writing of images, to memory, continues concurrent with the reading of first and second image blocks by the printer. While the read/write operations are not "concurrent", in absolute terms, they appear, to a system operator, as being concurrent.

In FIG. 25, the end of the job is written into EPC memory at blocks 306B, 306C and 306D, while the beginning of the printing of a second set is initiated at block 306E. For the printing of the second set, the image 2, along with the block for 1D need not be copied from disk. As should be recognized, the EPC memory and disk function in a manner comparable to a ring buffering arrangement in that image data from disk can be written over image data in the EPC memory, continually, in order to form a desired number of sets.

At step 362 (FIG. 17), it is determined whether an appropriate time has arrived for "garbage collection". In the present context, garbage collection refers to combining "spent blocks", i.e. blocks having image data already "consumed" by an output client, for future use. In one example, a check for garbage collection is performed after a predesignated number of images have been printed. More particularly, garbage collection is performed as a background task, i.e. during a noncritical time of a job cycle.

To implement garbage collection, the possibility of block combination is checked at step 364 and partial blocks are combined, if possible, at step 366. It follows that block combination constitutes, in one example, linking partial blocks with references. As blocks are formed from partial blocks (step 368), some partial block identifiers will be discarded and the resulting whole block will be placed in the free block list. If garbage collection is not performable, the process proceeds to step 372.

At step 372 (FIG. 18), a check is performed to determine if the currently completed image is the last image in the job. If the image is not the last image, then the process loops back to step 316 where the input/output client accesses the db 304 for another block identifier, assuming that the client is ready. If, on the other hand, the job is complete, then a determination is made, at step 374, as to whether repartitioning is required. Repartitioning is performed (step 376) so as to adjust nominal block size. Subsequent to repartitioning the process loops back to step 316.

Numerous features of the disclosed embodiment will be appreciated by those skilled in the art:

In one feature of the disclosed embodiment loopback image processing of a job is achieved with a high level of concurrency. In particular, an image processing section, which includes an input and an output, is flanked by a first transfer module and a second transfer module. Once a first job segment has been transmitted to the image processing section and image processed, the image processed first segment can be "pulled" out of the image processing section, with second transfer module, while a second job segment, buffered in the first transfer module, is being "pushed" into the image processing section with the first transfer module.

In another feature of the disclosed embodiment, the size of each of the first segment and the second segment can be adjusted in accordance with the degree to which bus masters are seeking access to a video bus. That is, each of the transfer modules includes a programmable buffer so that each segment can be set to a given packet size. Accordingly, when a relatively large number of bus masters is seeking access to the bus, the packet size of each segment can be kept relatively low so that all of the bus masters can access the video bus within a relatively brief interval. On the other hand, when a relatively few bus masters are seeking access to the video bus, the packet size of each segment can be set relatively high so that higher levels of image data can be pushed through the transfer modules.

In yet another feature of the disclosed embodiment, a printing machine with a network module and a video control module is provided. In one example, a controller, which services both of the modules, is provided in the network module. By placing the single controller in the network module, a desirable level of efficiency is obtained. For example, various functions can be performed in the video control module, on one or more jobs, while another function is being performed, with the controller, on yet another job.

In yet another feature of the disclosed embodiment, a facsimile device is coupled with one of the transfer modules. In some known applications, a processor or controller is used to service a facsimile card. By combining the facsimile device with the transfer module, once the transfer module has been programmed suitably by the controller, transfers, to or from the facsimile device, can be performed independently of the controller.

In another feature of the disclosed embodiment multiple segments of multiple jobs can be simultaneously outputted from multiple output devices. More particularly, once a segment of a first job is buffered in a first transfer module, a second segment can be transferred to a second output device while the first segment is being transferred to the first output device. This approach permits, in one example, a relatively slow device, such as a printer, to work on a part of a first job while another output device is servicing another part of another job. Indeed, when the bandwidth of a video bus is great enough, the buffers of the first and second transfer modules can be maintained at levels that permit simultaneous output from the first and second output devices.

What is claimed is:

1. A printing system, including a controller, for processing one or more images of a job with the job being stored in a job storage area and the images being represented by image signals, comprising:

a video bus for transmitting image signals of the job, represented by one or more segments, from the job storage area to one of a plurality of destinations;

an image processing section, communicating with said video bus, for performing one or more image processing operations on at least one image associated with the job;

a first transfer module, communicating with said video bus, including:
  a first buffer for buffering a first set of image signals representing a first segment of the job, and
  a first programmable direct memory access apparatus, responsive to the controller, for transferring the first segment of the job from said first buffer to said image processing section, wherein, in response to transferring the first segment, a second set of image signals, representing a second segment of the job is buffered in said first buffer; and a second transfer module, communicating with both said video bus and said second output device, said second transfer module being disposed in parallel with said first transfer module and including a second programmable direct memory access apparatus, responsive to the controller, for transferring the first segment of the job from said image processing section, to a selected one of a storage area and an output device, while the second segment of the job is being transferred from said first buffer to said image processing section.

2. The printing system of claim 1, in which said second transfer module includes a second buffer for buffering the image processed first segment, further comprising a bus master communicating with said video bus, wherein the image processed first segment is buffered in said second buffer concurrent with said bus master accessing said video bus.

3. The printing system of claim 1, in which each of the first segment and the second segment includes a preselected size, wherein said controller programs the first programmable direct memory access apparatus so that the preselected size of each of the first segment and the second segment is maintained at or below a preselected level.

4. The printing system of claim 4, in which a plurality of bus masters, along with said first and second transfer modules compete for access to said video bus, wherein the preselected size varies as a function of the number of bus masters seeking access to said video bus.

5. The printing system of claim 1, wherein each of the first segment and the second segment includes a preselected size with the preselected size of each of the first segment and the second segment being equal.

6. The printing system of claim 1, in which the printing system is partitioned into a video control module, and a network service module, the video control module including both said first transfer module and said second transfer module, and said network service module being adapted to receive image signals from a network connection, wherein said controller is disposed in said network service module and is used to process a third segment of the job while both the first and second segments are being processed in the video control module.

7. The printing system of claim 1, in which the printing system is partitioned into a video control module, and a network service module, the video control module including both said first transfer module and said second transfer module, and said network service module being adapted to receive image signals from a network connection, wherein the job storage area is disposed in the network service module and a second job is received in the job storage area while a segment of the first job is being transferred to said image processing section.

8. The printing system of claim 1, in which the printing system is partitioned into a video control module, and a network service module, the video control module including both said first transfer module and said second transfer module, and said network service module being adapted to receive image signals from a network connection, wherein said controller is disposed in said network service module and said image processing section includes a plurality of programmable registers for respectively controlling image processing operations to be performed on segments of the job, the plurality of programmable registers being programmed with the controller to perform the one or more image processing operations on the at least one image associated with the job.

9. The printing system of claim 1, further comprising a compressor, communicating with said second transfer module, for compressing the image processed first segment as it is transferred to said selected one of said storage area and said output device.

10. The printing system of claim 9, in which the printing system is partitioned into a video control module, and a network service module, the video control module including said first transfer module, said second transfer module and said job storage area, and said network service module is adapted to receive image signals from a network connection, wherein the compressed image processed first segment is transferred to the job storage area.

11. The printing system of claim 10, in which said selected one of said storage device and said output device comprises a facsimile device, wherein an electronic representation of the image processed first segment is transmitted from said facsimile device to a facsimile receiving device.

12. The printing system of claim 11, in which said second transfer module includes a second buffer for buffering the image processed first segment, wherein said second transfer module and said facsimile device are disposed in a single facsimile input/output module.

13. A printing system, including a controller, for managing respective output operations of a first job and a second job with each of the first and second jobs having a dimension and being represented by image signals, comprising:

a video bus for transmitting image signals of the first and second jobs thereacross;

a first storage area, communicating with said video bus, for storing the second job;

a first output device and a second output device, each of said first and second output devices communicating with said video bus;

a first transfer module, communicating with both said video bus and said first output device, including:
  a first buffer for buffering a first set of image signals representing a first segment of the first job, the first segment including a packet dimension, the packet dimension of the first segment being less than the first job dimension, and
  a first programmable direct memory access apparatus, responsive to the controller, for transferring the first segment of the job from the first buffer to said first output device, and a second transfer module, communicating with both said video bus and said second output device, said second transfer module being disposed in parallel with said first transfer module, said second transfer module including a second programmable direct memory access apparatus, responsive to the controller, for transferring a second set of image signals representing a second segment of the second job from said first storage area to said second output device while the first job segment is being transferred, with said first transfer module, to said first output device, the second segment including a packet dimension with the packet dimension of the second segment being less than the second job dimension.

14. The printing system of claim 13, in which said second transfer module includes a second buffer for buffering the image processed first segment, further comprising a bus master communicating with said video bus, wherein the second segment is buffered in said second buffer concurrent with said bus master accessing said video bus.

15. The printing system of claim 13, wherein said controller programs the first programmable direct memory apparatus in such a manner that the packet dimension of each of the first segment and the second segment is maintained at or below a preselected level.

16. The printing system of claim 15, in which a plurality of bus masters, along with said first and second transfer modules compete for access to said video bus, wherein the preselected level varies as a function of the number of bus masters seeking access to said video bus.

17. The printing system of claim 15, wherein the packet dimension of the first segment is equal to the packet dimension of the second segment.

18. The printing system of claim 13, in which the printing system is partitioned into a video control module, and a network service module, the video control module including both said first transfer module and said second transfer module, and said network service module is adapted to receive image signals from a network connection, further comprising a second job storage for storing the first job with the first job storage area being disposed in the network service module and the second job storage area being disposed in the video control module.

19. The printing system of claim 13, in which a selected one of said first output device and said second output device comprises a facsimile device, wherein an electronic representation of the first or second segment is transmitted from said facsimile device to a facsimile receiving device.

20. The printing system of claim 19, wherein said first transfer module is operatively coupled with said facsimile device to form a facsimile input/output module.

21. The printing system of claim 13, in which the second segment is part of an electronic page, wherein said second output device comprises a printing machine for printing a representation of the electronic page.

22. The printing system of claim 21, further comprising a decompressor, communicating with said second transfer module, for decompressing the electronic page as it is transferred to said printing machine.

* * * * *